US012505382B2

(12) United States Patent
Amid et al.

(10) Patent No.: US 12,505,382 B2
(45) Date of Patent: Dec. 23, 2025

(54) HYBRID FEDERATED LEARNING OF MACHINE LEARNING MODEL(S)

(71) Applicant: GOOGLE LLC, Mountain View, CA (US)

(72) Inventors: Ehsan Amid, Mountain View, CA (US); Rajiv Mathews, Sunnyvale, CA (US); Rohan Anil, Lafayette, CA (US); Shankar Kumar, New York, NY (US); Jared Lichtarge, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 491 days.

(21) Appl. No.: 18/074,729

(22) Filed: Dec. 5, 2022

(65) Prior Publication Data

US 2024/0070530 A1 Feb. 29, 2024

Related U.S. Application Data

(60) Provisional application No. 63/402,267, filed on Aug. 30, 2022.

(51) Int. Cl.
*G06N 3/098* (2023.01)
*G06N 20/00* (2019.01)

(52) U.S. Cl.
CPC ............. *G06N 20/00* (2019.01); *G06N 3/098* (2023.01)

(58) Field of Classification Search
CPC ............................... G06N 20/00; G06N 3/098
See application file for complete search history.

(56) References Cited

U.S. PATENT DOCUMENTS 12,147,879 B2 * 11/2024 Yu ..................... H04L 63/1425
12,353,604 B2 * 7/2025 Moran ................... G06N 20/10
(Continued)

FOREIGN PATENT DOCUMENTS

| CN | 112989944 | 6/2021 |
| CN | 112329073 | 7/2021 |
| WO | 2021158313 | 8/2021 |

OTHER PUBLICATIONS

Qu et al., "Quantization and Knowledge Distillation for Efficient Federated Learning on Edge Devices" 2020 IEEE 22nd International Conference on High Performance Computing and Communications; IEEE 18th International Conference on Smart City; IEEE 6th International Conference on Data Science and Systems. 6 pages. 2020.

(Continued)

*Primary Examiner* — Jorge A Casanova
(74) *Attorney, Agent, or Firm* — Gray Ice Higdon

(57) ABSTRACT

Implementations disclosed herein are directed to a hybrid federated learning (FL) technique that utilizes both federated averaging (FA) and federated distillation (FD) during a given round of FL of a given global machine learning (ML) model. Implementations may identify a population of client devices to participate in the given round of FL, determine a corresponding quantity of instances of client data available at each of the client devices that may be utilized during the given round of FL, and select different subsets of the client devices based on the corresponding quantity of instances of client data. Further, implementations may cause a first subset of the client devices to generate a corresponding FA update and a second subset of client devices to generate a corresponding FD update. Moreover, implementations may subsequently update the given global ML model based on the (Continued)

corresponding FA updates and the corresponding FD updates.

20 Claims, 6 Drawing Sheets

(56) References Cited

U.S. PATENT DOCUMENTS

| | | | |
|---|---|---|---|
| 2020/0027022 A1* | 1/2020 | Jha | G06N 3/08 |
| 2021/0166158 A1 | 6/2021 | Han et al. | |
| 2021/0326757 A1* | 10/2021 | Rawat | G06N 3/045 |
| 2023/0006977 A1* | 1/2023 | Poorebrahim Gilkalaye | G06N 3/082 |
| 2023/0145177 A1* | 5/2023 | Wang | H04L 41/145 706/10 |
| 2023/0177349 A1* | 6/2023 | Balakrishnan | H04L 67/10 706/25 |
| 2023/0177410 A1* | 6/2023 | Liao | G06N 3/082 706/12 |
| 2023/0214642 A1* | 7/2023 | Sidahmed | G06N 3/084 706/25 |
| 2023/0281508 A1* | 9/2023 | Du | G06N 3/084 706/12 |
| 2023/0316131 A1* | 10/2023 | Vandikas | H04W 24/02 706/12 |
| 2023/0351157 A1* | 11/2023 | Namgoong | G06N 3/047 |
| 2023/0394320 A1* | 12/2023 | Anand | G06N 3/098 |
| 2024/0070530 A1* | 2/2024 | Amid | G06N 20/00 |
| 2024/0095513 A1* | 3/2024 | Shen | G06N 3/084 |
| 2024/0104427 A1* | 3/2024 | Wang | G06N 3/08 |
| 2024/0152768 A1* | 5/2024 | Butt | G06F 9/5094 |
| 2024/0256898 A1* | 8/2024 | Ren | G06N 3/0495 |
| 2024/0256973 A1* | 8/2024 | Vandikas | G06N 20/00 |
| 2024/0296342 A1* | 9/2024 | Isaksson | G06N 3/098 |
| 2024/0370737 A1* | 11/2024 | Larsson | G06F 9/544 |
| 2024/0378507 A1* | 11/2024 | Cheng | G06N 3/084 |

OTHER PUBLICATIONS

Lin et al., "Ensemble Distillation for Robust Model Fusion in Federated Learning" arXiv:2006.07242v3 [cs.LG] 26 pages, dated Mar. 27, 2021.

* cited by examiner

HYBRID FEDERATED LEARNING OF MACHINE LEARNING MODEL(S)

BACKGROUND

Federated learning of machine learning (ML) model(s) is an increasingly popular ML technique for updating ML model(s). In traditional federated learning, an on-device ML model is stored locally on a client device of a user, and a global ML model, that is a cloud-based counterpart of the on-device ML model, is stored remotely at a remote system (e.g., a cluster of servers). During a given round of federated learning, the client device, using the on-device ML model, can process an instance of client data detected at the client device to generate predicted output, and can compare the predicted output to ground truth output to generate a client gradient. Further, the client device can transmit the client gradient to the remote system, or can update the on-device ML model locally at the client device and transmit the updated on-device ML model (or updated on-device weight (s) thereof) to the remote system. The remote system can utilize the client gradient (or the updated on-device ML model or the updated on-device weight(s) thereof), and optionally additional client gradients generated in a similar manner at additional client devices (or additional updated on-device ML model(s) or additional updated on-device weight(s) thereof updated in the same or similar manner at the additional client devices), to update global weight(s) of the global ML model. The remote system can transmit the global ML model (or updated global weight(s) of the global ML model), to the client device (and/or the additional client devices). The client device (and/or the additional client devices) can then replace the on-device ML model with the global ML model (or replace the on-device weight(s) of the on-device ML model with the updated global weight(s) of the global ML model), thereby updating the on-device ML model.

One common technique that may be utilized in federated learning is federated averaging. In federated averaging, the remote system may average, for the given round of federated learning, the gradient (or the updated on-device weight(s) for the updated on-device ML model) received from the client device and the additional gradients (or the additional updated on-device weight(s) of the additional updated on-device ML models) received from the additional client devices, and utilize the average gradient (or the average updated on-device weights(s) for the updated on-device ML models) to update the global weight(s) of the global ML model. However, federated averaging has a relatively small learning rate on the client devices since the on-device ML model(s) need to be updated at each subsequent round of federated learning to minimize the impact of what is referred to as client drift. Further, federated averaging may be computationally inefficient in that the least computationally efficient client device that participates in the given round of federated learning restricts the federated learning architecture. Accordingly, utilizing federated averaging as the sole technique for updating the global weight(s) of the global ML model may result in unstable and/or slow convergence for the global ML model.

Another common technique that may be utilized in federated learning is federated distillation. In federated distillation, the remote system may distill the updated on-device ML model(s) (which may be referred to as teacher model(s) in the context of federated distillation) into the global ML model (which may be referred to as a student model in the context of federated distillation) for the given round of federated learning. Notably, the on-device ML model(s) may be utilized repeatedly for subsequent rounds of federated learning, thereby providing relatively faster convergence of the global ML model when compared to federated averaging. However, federated distillation requires a relatively larger learning rate for the on-device ML model(s) and still results in relatively slow convergence of the global ML model, especially when the global ML model is randomly initialized. Further, federated distillation may be prone to overfitting to instances of client data detected at the client devices due to the relatively larger learning rate and the relative scarcity of instances of client data detected at the client device that are available at the client devices for utilization in federated learning. Accordingly, utilizing federated distillation as the sole technique for updating the global weight(s) of the global ML model may still result in relatively slow convergence for the global ML model, and may result in the global ML model being almost identical to the on-device ML model(s) utilized in generating the gradients due to the overfitting.

SUMMARY

Implementations described herein are directed to utilizing a hybrid federated learning technique that combines aspects of both federated averaging and federated distillation in updating global machine learning (ML) model(s). For instance, processor(s) of a remote system may identify a population of client devices to participate in a given round of federated learning for updating a given global ML model, and determine a corresponding quantity of instances of client data available at each of the client devices that may be utilized in updating the given global ML model during the given round of federated learning. Based on the corresponding quantity of instances of client data available at each of the client devices, the processor(s) of the remote system may select a first subset of first subset client devices and a second subset of second subset client devices from among the client devices of the population. Further, the processor(s) of the remote system may cause each of the first subset client devices (i.e., that were selected for inclusion in the first subset) to generate a corresponding federated averaging update to be utilized in federated averaging of the given global ML model, and may cause each of the second subset client devices (i.e., that were selected for inclusion in the second subset) to generate a corresponding federated distillation update to be utilized in federated distillation of the given global ML model. Moreover, the processor(s) of the remote system may update the given global ML model using federated averaging and based on the corresponding federated averaging updates generated by the first subset client devices to generate an updated global ML model, and may further update the updated global ML model using federated distillation and based on the corresponding federated distillation updates generated by the second subset client devices to generate a further updated global ML model.

Accordingly, the hybrid federated learning technique described herein addresses the shortcomings of other techniques that solely utilize federated averaging or federated distillation. For instance, the hybrid federated learning technique described herein enables the processor(s) of the remote system to perform multiple updates to the given global ML model for a single round of federated learning by initializing the given global ML model via the corresponding federated averaging updates, and subsequently updating the given global ML model via the corresponding federated distillation updates. This may result in quicker and more efficient convergence of the given global ML model, and may obviate issues associated with client drift. Further, the hybrid federated learning technique described herein enables the processor(s) of the remote system to select the different subsets of the client devices based on the corresponding instances of client data that are available at each of the client devices. This may obviate issues associated with overfitting to the corresponding instances of client data by selecting the client devices with more corresponding instances of client data for inclusion in the second subset that generates the corresponding federated distillation updates. As a result, the hybrid federated learning technique described herein enables the processor(s) of the remote system to benefit from the advantages of both federated averaging and federated distillation, while minimizing the shortcomings of these techniques when utilized individually.

In various implementations, and in determining the corresponding quantity of instances of client data available at each of the client devices that may be utilized in updating the given global ML model during the given round of federated learning, the processor(s) of the remote system may generate and transmit a query to each of the client devices of the population that requests an indication of the corresponding quantity of instances of client data available for updating the given global ML model during the given round of federated learning. Further, each of the client devices may provide the processor(s) of the remote system with the indication of the corresponding quantity of instances of client data available for updating the given global ML model during the given round of federated learning in response to receiving the query. In some versions of those implementations, the query may be based on a type of the given global ML model to be updated during the given round of federated learning. For instance, assume that the given global ML model to be updated during the given round of federated learning corresponds to a given audio-based global ML model. In this instance, the query may request an indication of how many instances of corresponding audio data are available for updating the given audio-based global ML model during the given round of federated learning. In contrast, assume that the given global ML model to be updated during the given round of federated learning corresponds to a given vision-based global ML model. In this instance, the query may request an indication of how many instances of corresponding vision data are available for updating the given vision-based global ML model during the given round of federated learning. In contrast, assume that the given global ML model to be updated during the given round of federated learning corresponds to a given text-based global ML model. In this instance, the query may request an indication of how many instances of corresponding textual data are available for updating the given text-based global ML model during the given round of federated learning.

In various implementations, the processor(s) of the remote system generate a distribution of the client devices of the population based on the corresponding quantity of instances that are available for updating the given global ML model during the given round of federated learning. This enables the processor(s) of the remote system to select client devices that belong to a first portion of the distribution for inclusion in the first subset, and to select client devices that belong to a second portion of the distribution (e.g., that is distinct from the first portion of the distribution) for inclusion in the second subset. For instance, the client devices of the population that include fewer corresponding instances of client data may be selected for inclusion in the first subset that generates the corresponding federated averaging updates, whereas the client devices of the population that include more corresponding instances of client data may be selected for inclusion in the second subset that generates the corresponding federated distillation updates. This may help ensure that the given global ML model is not overfit to the corresponding instances of the client data by enabling the corresponding federated distillation updates to be generated at client devices that include more corresponding instances of client data. In some versions of those implementations, this enables the second subset client devices that are selected for inclusion in the second subset to have a relatively larger learning rate than the first subset client devices that are selected for inclusion in the first subset, enabling them to move faster in the parameter space. As a result, the second subset client devices that are selected for inclusion in the second subset may be referred to as "fast clients", whereas the first subset client devices that are selected for inclusion in the first subset may be referred to as "slow clients".

In some implementations, and in causing each of the first subset client devices (i.e., that were selected for inclusion in the first subset) to generate the corresponding federated averaging update to be utilized in federated averaging of the given global ML model, the processor(s) of the remote system may cause a given first subset client device to process, using a corresponding on-device ML model that is an on-device counterpart of the given global ML model and that is stored in on-device storage of the given first subset client device, a given corresponding instance of client data that is generated locally at the given first subset client device. Further, the processor(s) of the remote system may cause the given first subset client device to generate a given first subset client device gradient based on processing the corresponding instance of client data and using a supervised, semi-supervised, or unsupervised learning technique.

In some versions of those implementations, the given first subset client device gradient may correspond to a given corresponding federated averaging update that is generated by the given first subset client device, and that is utilized in updating the given global ML model. For instance, the given first subset client device may transmit the given first subset client device gradient back to the processor(s) of the remote system. In response to receiving the given first subset client device gradient (and other first subset client device gradients from other first subset client devices that were selected for inclusion in the first subset), the processor(s) of the remote system may average the first subset client device gradients to generate an average gradient for the first subset client devices, and update the given global ML model based on the average gradient for the first subset client devices.

In additional or alternative versions of those implementations, the given first subset client device gradient may be utilized to update the corresponding on-device ML model locally at the given first subset client device to generate an updated corresponding on-device ML model. In these implementations, on-device weight(s) of the updated corresponding on-device ML model may correspond to a given corresponding federated averaging update that is generated by the given first subset client device, and that is utilized in updating the given global ML model. For instance, the given first subset client device may transmit the on-device weight(s) of the updated corresponding on-device ML model back to the processor(s) of the remote system. In response to receiving the on-device weight(s) (and other on-device weight(s) from other first subset client devices that were selected for inclusion in the first subset), the processor(s) of the remote system may average the on-device weight(s) difference(s) to generate average on-device weight(s) difference(s) for the first subset client devices, and update the given global ML model based on the average on-device weight(s) difference(s) for the first subset client devices.

In some implementations, and in causing each of the second subset client devices (i.e., that were selected for inclusion in the second subset) to generate the corresponding federated distillation update to be utilized in federated distillation of the given global ML model, the processor(s) of the remote system may cause a given second subset client device to process, using a corresponding on-device ML model that is an on-device counterpart of the given global ML model and that is stored in on-device storage of the given second subset client device, a given corresponding instance of client data that is generated locally at the given second subset client device. Further, the processor(s) of the remote system may cause the given second subset client device to generate a given second subset client device gradient based on processing the corresponding instance of client data and using a supervised, semi-supervised, or unsupervised learning technique. Moreover, the processor(s) of the remote system may cause the given second subset client device to update the corresponding on-device ML model locally at the given second subset client device to generate an updated corresponding on-device ML model.

In some versions of those implementations, the updated corresponding on-device ML model may correspond to a given corresponding federated distillation update that is generated by the given second subset client device, and that is utilized in further updating the given global ML model. For instance, the given second subset client device may transmit the updated corresponding on-device ML model back to the processor(s) of the remote system. In response to receiving the updated corresponding on-device ML model (and other updated corresponding on-device ML model from other second subset client devices that were selected for inclusion in the second subset), the processor(s) of the remote system may distill each of the updated corresponding on-device ML models into the given global ML model to generate the further updated global ML model.

In various implementations, the processor(s) of the remote system may distribute the further updated global ML model to at least the first subset client devices. Notably, the corresponding on-device ML models that are stored locally at client devices that are selected for inclusion in a subset that is utilized in federated averaging may need to have the same ML model in terms of architecture, weights, shapes, and/or other parameters. Accordingly, the processor(s) of the remote system may only distribute the further updated global ML model to the first subset client devices, but not the second subset client devices. However, in some versions of those implementations, the processor(s) of the remote system may also distribute the further updated global ML model to the second subset client devices. In some versions of those implementations, the given round of federated learning may be considered to have concluded when the processor(s) of the remote system distribute the further updated global ML model to the first subset client devices and/or the second subset client devices. However, in other implementations, the given round of federated learning may be considered to have concluded when the processor(s) of the remote system further update the updated global ML model using federated distillation (e.g., without considering whether the further updated global ML model has been distributed to any client devices).

The above description is provided as an overview of some implementations of the present disclosure. Further descrip- tion of those implementations, and other implementations, are described in more detail below.

DETAILED DESCRIPTION

Figure 1:
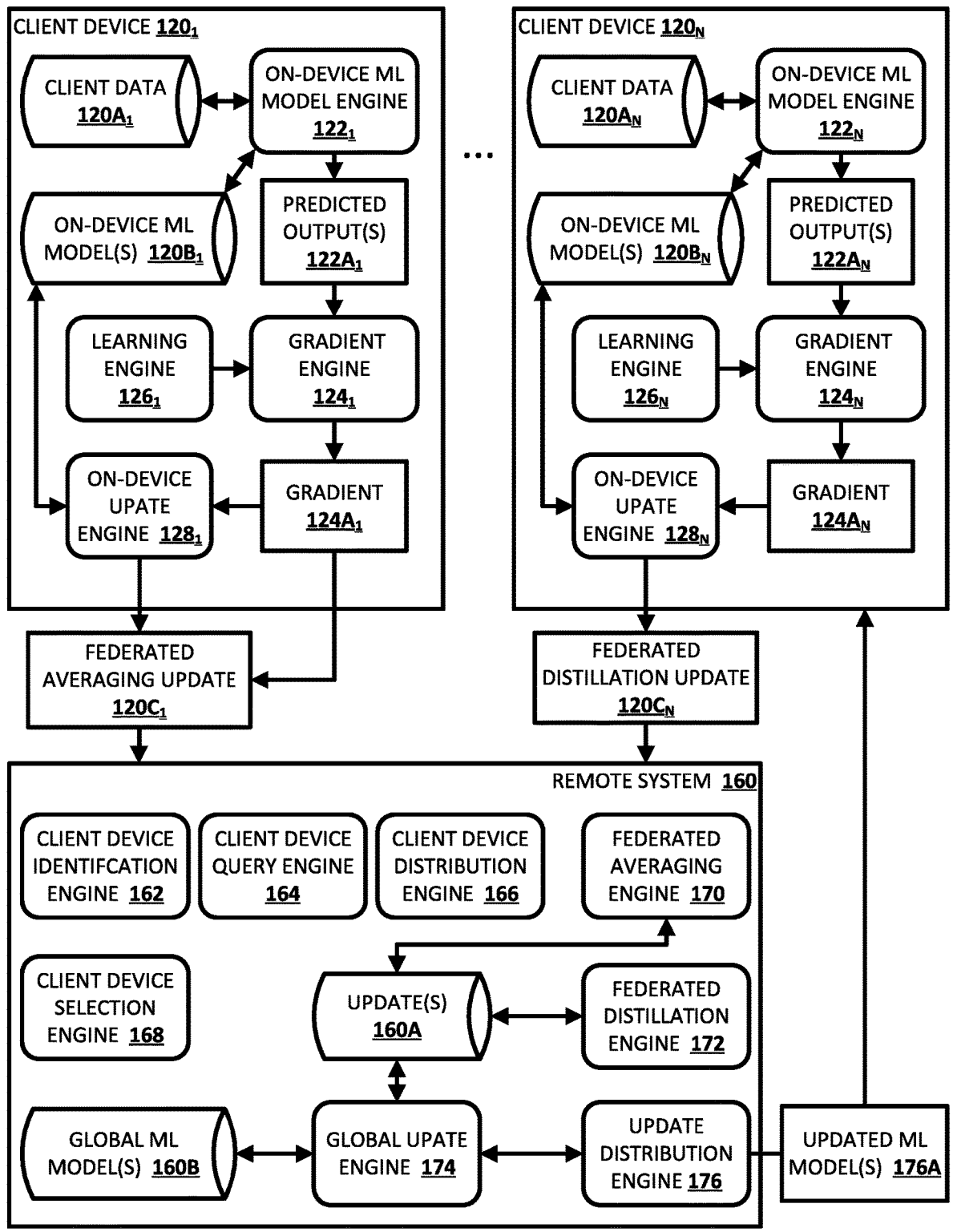
FIG. 1 depicts an example process flow that demonstrates various aspects of the present disclosure, in accordance with various implementations.

FIG. 1 depicts an example process flow that demonstrates various aspects of the present disclosure. A plurality of client devices $110_1$-$110_N$ and a remote system 160 are illustrated in FIG. 1, and each include the components that are encompassed within the corresponding boxes of FIG. 1 that represent the client devices $110_1$-$110_N$, and the remote system, respectively. The plurality of client devices $110_1$-$110_N$ and the remote system 160 may be utilized to implement a hybrid federated learning technique as described herein. The hybrid federated learning technique described herein may combine, for example, a federated averaging technique and a federated distillation technique during a given round of federated learning of a given global machine learning (ML) model (e.g., that is stored in global ML model(s) database 160B).

In various implementations, a client device identification engine 162 of the remote system 160 may identify a population of client devices to participate in the given round of federated learning of the given global ML model. In some implementations, the client device identification engine 162 may identify all available client devices that are communicatively coupled to the remote system 160 (e.g., over one or more networks) for inclusion in the population of client devices to participate in the given round of federated learning of the given global ML model. In other implementations, the client device identification engine 162 may identify a particular quantity of client devices (e.g., 100 client devices, 1,000 client devices, 10,000 client devices, and/or other quantities of client devices) that are communicatively coupled to the remote system 160 for inclusion in the population of client devices to participate in the given round of federated learning of the given global ML model. For the sake of example throughout FIG. 1, assume that at least client device $110_1$ and client device $110_N$ are identified for inclusion in the population of client devices along with a plurality of additional client devices (e.g., as indicated by the ellipses between the client device $110_1$ and the client device $110_N$).

In various implementations, a client device query engine 164 of the remote system 160 may determine a corresponding quantity of instances of client data that are available at each of the client devices (e.g., stored in a corresponding client data database 120A₁-120Aₙ) of the population for updating the given global ML model during the given round of federated learning, such as a quantity of corresponding instances of audio data available at each of the client devices of the population, a quantity of corresponding instances of vision data available at each of the client devices of the population, a quantity of corresponding instances of textual data available at each of the client devices of the population, and/or quantities of corresponding instances of other client data available at each of the client devices of the population. For example, the client device query engine 164 may generate and transmit a corresponding query to each of the client devices of the population. The corresponding query may request an indication of the corresponding quantity of instances of client data available for updating the given global ML model during the given round of federated learning. Further, the client device query engine 164 may receive, responsive to the corresponding queries and from each of the client devices of the population, the indication of the corresponding quantity of instances of client data available for updating the given global ML model during the given round of federated learning.

In some versions of those implementations, the corresponding query that is transmitted to each of the client devices of the population may depend on a type of the given global ML model to be updated during the given round of federated learning. For example, assume that the given global ML model to be updated during the given round of federated learning corresponds to a global audio-based ML model that processes corresponding instances of audio data to generate one or more predicted outputs with respect to the audio data. In this example, the corresponding query that is transmitted to each of the client devices of the population may request an indication of the corresponding quantity of instances of audio data available for updating the global audio-based ML model during the given round of federated learning. In contrast, assume that the given global ML model to be updated during the given round of federated learning corresponds to a global vision-based ML model that processes corresponding instances of vision data to generate one or more predicted outputs with respect to the vision data. In this example, the corresponding query that is transmitted to each of the client devices of the population may request an indication of the corresponding quantity of instances of vision data available for updating the global vision-based ML model during the given round of federated learning.

In various implementations, a client device distribution engine 166 of the remote system 160 may generate a distribution of the client devices of the population. The client device distribution engine 166 may generate the distribution of the client devices of the population based on, for example, the corresponding quantity of instances of client data that are available at each of the client devices of the population for the given round of federated learning. For example, client devices that have a first corresponding quantity of instances of client data that are available for the given round of federated learning may be assigned to a first portion of the distribution, client devices that have a second corresponding quantity of instances of client data that are available for the given round of federated learning may be assigned to a second portion of the distribution, client devices that have a third corresponding quantity of instances of client data that are available for the given round of federated learning may be assigned to a third portion of the distribution, and so on.

In various implementations, a client device selection engine 168 of the remote system 160 may select, from among the population of client devices, a first subset of first subset client devices and a second subset of second subset client devices to be utilized in the given round of federated learning of the given global ML model. Although the different subsets of client devices are both utilized in the given round of federated learning of the given global ML model, the different subsets of client devices may be utilized in different manners during the given round of federated learning of the given global ML model. For example, the first subset of first subset client devices may be utilized to implement a federated averaging technique during the given round of federated learning, whereas the second subset of second subset client devices may be utilized to implement a federated distillation technique during the same given round of federated learning. Notably, in selecting the first subset of first subset client devices and the second subset of second subset client devices to be utilized in the given round of federated learning of the given global ML model, the client device selection engine 168 may select all of the client devices, of the population, for inclusion in either the first subset of first subset client devices or the second subset of second subset client devices, or the client device selection engine 168 may select only a portion of the client devices, of the population, for inclusion in either the first subset of first subset client devices or the second subset of second subset client devices.

In some versions of those implementations, the client device selection engine 168 may select the first subset of first subset client devices and the second subset of second subset client devices to be utilized in the given round of federated learning of the given global ML model based on the distribution of the client devices of the population generated by the client device distribution engine 166. For example, the client device selection engine 168 may select the client devices of the population that include less than a threshold quantity of instances of client data for inclusion in the first subset of first subset client devices, and may select the client devices of the population that include more than the threshold quantity of instances of client data for inclusion in the second subset of second subset client devices. In this example, the client devices of the population that include less than the threshold quantity of instances of client data may be selected for inclusion in the first subset of first subset client devices since the first subset client devices may be utilized in performing the federated averaging technique, which has a relatively slower learning rate than the federated distillation technique and these client devices are better suited for utilization with the federated averaging technique. Similarly, the client devices of the population that include more than the threshold quantity of instances of client data may be selected for inclusion in the second subset of second subset client devices since the second subset client devices may be utilized in performing the federated distillation technique, which has a relatively larger learning rate than the federated averaging technique and these client devices are better suited for utilization with the federated distillation technique.

For the sake of example throughout FIG. 1, assume that the client device 110₁ is selected for inclusion in the first subset of first subset client devices to be utilized with respect to the federated averaging technique during the given round of federated learning of the given global ML model. Further assume that the client device 110ₙ is selected for inclusion in the second subset of second subset client devices to be utilized with respect to the federated distillation technique during the given round of federated learning of the given global ML model. Although FIG. 1 is only described with respect to the client device $110_1$ being selected for inclusion in the first subset of first subset client devices and the client device $110_N$ being selected for inclusion in the second subset of second subset client devices, it should be understood that is for the sake of example to illustrate the hybrid federated learning technique described herein and is not meant to be limiting. Further, although the first subset client devices are described with respect to being selected for utilization with the federated averaging technique and the second subset client devices are described with respect to being selected for utilization with the federated distillation technique, it should be understood that is also for the sake of example and is not meant to be limiting.

In various implementations, an on-device ML engine $122_1$ of the client device $110_1$ may process, using a corresponding on-device ML model that is stored in on-device storage of the client device $110_1$ (e.g., stored in on-device ML model(s) database $120B_1$) and that is an on-device counterpart of the given global ML model being updated during the given round of federated learning, a corresponding instance of client device (e.g., stored in the client data database $120A_1$). Based on processing the corresponding instance of client data and using the corresponding on-device ML model, the on-device ML engine $122_1$ may generate one or more predicted outputs $122A_1$. The corresponding instance of client data may be, for example, audio data that captures a spoken utterance and/or other noise that is generated by one or more microphones of the client device $120_1$, vision data that captures an environment of the client device $120_1$ (e.g., a user of the client device $120_1$, including hand gesture(s) and/or movement(s), body gesture(s) and/or body movement(s), eye gaze, facial movement, mouth movement, etc., object(s) in an environment of the user of the client device $120_1$, etc.) that is generated via one or more vision components of the client device $120_1$, textual data generated via one or more interfaces of the client device $120_1$ (e.g., a touchscreen, a keyboard, etc.), and/or other client data.

Notably, the corresponding on-device ML model (and other on-device ML model(s)) may be initially trained by the remote system 160 and based on a server data set, and transmitted to the plurality of client devices $120_1$-$120_N$. The corresponding on-device ML model(s) described herein may include, for example, various audio-based ML models that are utilized to process the corresponding instances of audio data generated locally at the plurality of client devices $120_1$-$120_N$, various vision-based ML models that are utilized to process corresponding instances of vision data generated locally at the plurality of client devices $120_1$-$120_N$, various text-based ML models that are utilized to process corresponding instances of textual data generated locally at the plurality of client devices $120_1$-$120_N$, and/or any other ML model that may be updated utilizing the hybrid federated learning technique described herein (e.g., the various ML models described with respect to FIG. 2).

For example, assume that the given global ML model to be updated utilizing the hybrid federated learning technique is a global hotword model (e.g., a global audio-based ML model). In this example, the client device $120_1$ may receive the global hotword model from the remote system 160, and store the global hotword model in the on-device ML model(s) database $120B_1$ as a corresponding on-device hotword model that is an on-device counterpart of the global hotword detection model. In storing the global hotword detection model in the on-device ML model(s) database $120B_1$ as the corresponding on-device hotword model, the client device $120_1$ may optionally replace a prior instance of corresponding on-device hotword model (or one or more on-device weights thereof) with the global hotword detection model (or one or more global weights thereof). Further, in generating the one or more predicted outputs $122A_1$, the on-device ML model engine $122_1$ may process, using the corresponding on-device hotword model, a corresponding instance of the audio data to generate a prediction of whether the audio data captures a particular word or phrase (e.g., "Assistant", "Hey Assistant", etc.) that, when detected, causes an automated assistant executing at least in part at the client device to be invoked. In this example, the prediction of whether the corresponding instance of audio data captures the particular word or phrase can include a binary value of whether the corresponding instance of audio data is predicted to include the particular word or phrase, a probability or log likelihood that of whether the corresponding instance of audio data is predicted to include the particular word or phrase, and/or other value(s) and/or measure(s).

As another example, assume that the given global ML model to be updated utilizing the hybrid federated learning technique is a global hotword free invocation model (e.g., a global vision-based ML model). In this example, the client device $120_1$ may receive the global hotword free invocation model from the remote system 160, and store the global hotword model in the on-device ML model(s) database $120B_1$ as a corresponding on-device hotword free invocation model that is an on-device counterpart of the global hotword detection model in the same or similar manner described above. Further, in generating the one or more predicted outputs $122A_1$, the on-device ML model engine $122_1$ may process, using the corresponding on-device hotword free invocation model, a corresponding instance of the vision data to generate a prediction of whether the corresponding instance vision data captures a particular physical gesture or movement (e.g., lip movement, body position and/or movement, eye gaze, etc.) that, when detected, causes the automated assistant executing at least in part at the client device $120_1$ to be invoked. In this example, the prediction of whether the corresponding instance vision data is predicted to include the particular physical gesture or movement may include a binary value of whether the corresponding instance of vision data is predicted to include the particular physical gesture or movement, a probability or log likelihood that of whether the corresponding instance of vision data is predicted to include the particular physical gesture or movement, and/or other value(s) and/or measure(s).

In some implementations, a gradient engine $124_1$ of the client device $120_1$ may process at least the one or more predicted outputs $122A_1$ to generate a gradient $124A_1$. In some versions of those implementations, the gradient engine $124_1$ may interact with a learning engine $126_1$ of the client device $120_1$ to generate the gradient $124A_1$ by using one or more supervised learning techniques and/or one or more unsupervised learning or semi-supervised learning techniques. In these implementations, the learning engine $126_1$ may utilize the one or more supervised learning technique in instances when a supervision signal is available for the corresponding instance of client data, but may utilize the one or more unsupervised or semi-supervised learning technique in instances when no supervision signal is available for the corresponding instance of client data. For example, again assume that the given global ML model to be updated during the given round of federated learning corresponds to the global hotword detection model. Further assume that the corresponding instance of client data corresponds to audio data previously generated by microphone(s) of the client device $120_1$ that captures a spoken utterance of a user of the client device $120_1$ that includes a particular word or phrase that invoked an automated assistant executing at least in part at the client device $120_1$. In this example, further assume that the audio data is stored in association with an indication that the audio data does, in fact, include a particular word or phrase that invoked the automated assistant. Accordingly, in this example, the learning engine $126_1$ may cause the gradient engine $124_1$ to utilize the stored indication as a supervision signal that may be utilized in generating the gradient $124A_1$ according to a supervised learning technique.

For instance, the on-device ML model engine $122_1$ may process, using the corresponding on-device hotword model, the audio data that captures the spoken utterance to generate the one or more predicted outputs $122A_1$. In this instance, the one or more predicted outputs $122A_1$ may include a predicted value or measure that indicates whether the audio data is predicted to include the particular word or phrase (e.g., a probability of 0.65 that corresponds to a confidence value that the audio data is predicted to the include the particular word or phrase). Accordingly, the gradient engine $124_1$ may compare the one or more predicted outputs $122A_1$ (e.g., the probability of 0.65) to the stored indication provided by the learning engine $126_1$ for utilization as a supervision signal (e.g., a ground truth probability of 1.0 that indicates the audio data does, in fact, include the particular word or phrase) to generate the gradient $124A_1$ to reinforce that the audio data does include the particular word or phrase. In this instance, the gradient $124A_1$ may be non-zero gradient (e.g., based on extent of mismatching between the one or more predicted outputs $122A_1$ and the supervision signal and made based on a deterministic comparison therebetween). However, in other instances, the gradient $124A_1$ may be a zero gradient (e.g., when the one or more predicted outputs $122A_1$ match the supervision signal).

However, in the above example, assume that the audio data is not stored in association with an indication that the audio data does, in fact, include a particular word or phrase that invoked the automated assistant (e.g., there is no supervision signal). Accordingly, in this example, the learning engine $126_1$ may cause the gradient engine $124_1$ to utilize an unsupervised or semi-supervised learning technique in generating the gradient $124A_1$, such as a teacher-student technique, a client data masking technique, and/or other unsupervised or semi-supervised learning techniques.

For instance, and according to a teacher-student technique, the learning engine $126_1$ may process, using a benchmark hotword model (e.g., stored in on-device ML model(s) database $120B_1$, the global ML model(s) database $160B$, and/or otherwise accessible by the client device $120_1$), the audio data to generate one or more benchmark outputs that are also indicative of whether the audio data captures a particular word or phrase, when detected, causes an automated assistant executing at least in part at the client device $120_1$ to be invoked. In these and other instances, the benchmark hotword model may be the corresponding on-device hotword detection model utilized to generate the one or more predicted outputs $122A_1$ or another, distinct hotword detection model. Further, the gradient engine $124_1$ may compare the one or more predicted outputs $122A_1$ generated by the on-device ML engine $122_1$ and the one or more benchmark outputs generated by the learning engine $126_1$ to generate the gradient $124A_1$ in this teacher-student technique.

Also, for instance, and according to a client data masking technique, the learning engine $126_1$ may mask a target portion of the audio data (e.g., a portion of the data that includes the particular word or phrase in the audio data). In these and other instances, the on-device ML model engine $122_1$ may process, using the corresponding on-device hotword model, other portions of the audio data in generating the one or more predicted outputs $122A_1$. The one or more predicted outputs $122A_1$ may still include a predicted value or measure indicative of whether the target portion of the audio data is predicted to include the particular word or phrase based on processing the other portions of the audio data (e.g., based on audio features of the other portions of the audio data, such as mel-bank features, mel-frequency cepstral coefficients, and/or other features of the other portions of the audio data). In some of these instances, the learning engine $126_1$ may also process, using the corresponding on-device hotword model, an unmasked version of the audio data to generate one or more benchmark outputs indicative of a predicted value or measure indicative of whether the target portion of the audio data is predicted to include the particular word or phrase. Further, the gradient engine $124_1$ may compare the one or more predicted outputs $122A_1$ generated by the on-device ML engine $122_1$ and the one or more benchmark outputs generated by the learning engine $126_1$ to generate the gradient $124A_1$ in this client data masking technique. Although the above example of unsupervised or semi-supervised learning described particular techniques, it should be understood that those techniques are provided as non-limiting examples of unsupervised or semi-supervised learning and are not meant to be limiting. Moreover, although the above examples are described with respect to hotword detection models, it should be understood that is also for the sake of example and is not meant to be limiting.

In various implementations, the gradient $124A_1$ may be utilized as a corresponding federated averaging update $120C_1$ that is transmitted to the remote system $160$ for utilization in updating the given global ML model (e.g., as described below with respect to a federated averaging engine $170$ of the remote system $160$). In additional or alternative implementations, an on-device update engine $128_1$ of the client device $120_1$ may update the corresponding on-device ML model locally at the client device $120_1$. In updating the corresponding on-device ML model locally at the client device $120_1$, the on-device update engine $128_1$ may update one or more on-device weights of the corresponding on-device ML model, thereby resulting in an updated corresponding on-device ML model that includes one or more updated on-device weights. In some versions of these implementations, the updated corresponding on-device ML model and/or the one or more updated on-device weights thereof may correspond to the federated averaging update $120C_1$ that is transmitted to the remote system $160$ for utilization in updating the given global ML model (e.g., as described below with respect to the federated averaging engine $170$). In additional or alternative versions of these implementations, differences between one or more on-device weights (e.g., pre-update) and the one or more updated on-device weights of the updated corresponding on-device ML model may correspond to the federated averaging update $120C1$ that is transmitted to the remote system $160$ for utilization in updating the given global ML model.

Although FIG. 1 is described with respect to the client device $120_1$ being the only client selected for inclusion in the first subset of first subset client devices to be utilized with respect to the federated averaging technique, it should be understood that is for the sake of brevity and is not meant to be limiting. Rather, it should be understood that the engines and operations described above with respect to the client device $120_1$ may be implemented at a plurality of additional client devices that are also selected for inclusion in the first subset of first subset client devices to generate additional corresponding federated averaging updates in the same or similar manner.

Notably, the client device $120_N$ that was selected for inclusion in the second subset of second subset client devices may process one or more corresponding instances of client data generated locally at the client device $120_N$ in the same or similar manner described with respect to the client device $120_1$, but with some differences. For example, in various implementations, an on-device ML engine $122_N$ of the client device $110_N$ may process, using a corresponding on-device ML model that is stored in on-device storage of the client device $110_N$ (e.g., stored in on-device ML model(s) database $120B_N$) and that is an on-device counterpart of the given global ML model being updated during the given round of federated learning, a corresponding instance of client device (e.g., stored in the client data database $120A_N$) in the same or similar manner described above with respect to the client device $120_1$. Based on processing the corresponding instance of client data and using the corresponding on-device ML model, the on-device ML engine $122_N$ may generate one or more predicted outputs $122A_N$. Further, a gradient engine $124_N$ and/or a learning engine $126_N$ of the client device $120_N$ may generate a gradient $124A_N$ based on processing the corresponding instance of client data and using one or more supervised learning techniques and/or unsupervised or semi-supervised learning techniques in the same or similar manner described above with respect to the client device $120_1$. Moreover, an on-device update engine $128_N$ of the client device $120_N$ may generate an updated corresponding on-device ML model that includes one or more updated on-device weights based on the gradient $124A_N$ in the same or similar manner described above with respect to the client device $120_1$.

However, and in contrast with the processing described with respect to the client device $120_1$, one or more additional corresponding instances of client data may be processed locally at the client device $120_N$ to continue updating the updated corresponding on-device ML model based on one or more additional corresponding gradients generated based on the additional processing. Further, and in contrast with the processing described with respect to the client device $120_1$, the gradient $124A_N$ may not be utilized as a corresponding federated distillation update $120C_N$ that is transmitted to the remote system 160. Rather, the corresponding federated distillation update $120C_N$ that is transmitted to the remote system 160 may include the updated corresponding on-device ML model, the includes one or more updated on-device weights of the updated corresponding on-device ML model, and/or one or more labels generated using the updated corresponding on-device ML model for utilization in updating the given global ML model (e.g., as described below with respect to a federated distillation engine 172 of the remote system 160).

In implementations where the corresponding federated distillation update $120C_N$ corresponds to the one or more labels generated using the updated corresponding on-device ML model, the learning engine $126_N$ may process, using the updated corresponding on-device ML model, public data that is publicly available and accessible to both the client device $120_N$ and the remote system 160. Based on processing the public data, the learning engine $126_N$ may generate one or more labels that correspond to the corresponding federated distillation update $120C_N$. Notably, in these implementations, the one or more labels may subsequently be utilized as a supervision signal updating the given global ML model. In other words, the updated corresponding on-device ML model may be utilized as a teacher ML model to generate one or more labels for updating the given global ML model, which may correspond to a student ML model. This is similar to the teacher-student techniques described above, but distributed across multiple computing systems (e.g., distributed across the client device $120_N$ and the remote system 160). Accordingly, information learned in updating the corresponding on-device ML model may be distilled into the given global ML model.

Although FIG. 1 is described with respect to the client device $120_N$ being the only client selected for inclusion in the second subset of second subset client devices to be utilized with respect to the federated distillation technique, it should be understood that is for the sake of brevity and is not meant to be limiting. Rather, it should be understood that the engines and operations described above with respect to the client device $120_N$ may be implemented at a plurality of additional client devices that are also selected for inclusion in the second subset of second subset client devices to generate additional corresponding federated distillation updates in the same or similar manner.

In various implementations, the federated averaging engine 170 may combine the corresponding federated averaging update $120C_1$ received from the client device $120_1$ with a plurality of additional corresponding federated averaging updates received from additional client devices that were also selected for inclusion in the first subset of first subset client devices. For example, in implementations where the gradient $124A_1$ corresponds to the corresponding federated averaging update $120C_1$ received from the client device $120_1$, the federated averaging engine 170 may generate an average gradient that is an average of the gradient $124A_1$ and a plurality of additional gradients received from additional client devices that were also selected for inclusion in the first subset of first subset client devices. Further, a global update engine 174 of the remote system may update the given global ML model (e.g., a remote-based counterpart of the corresponding on-device ML model utilized in generating the gradient $124A_1$) based on the average gradient. Notably, in these implementations, the federated averaging engine 170 may wait until these gradients are received from each of the first subset client devices. Accordingly, any gradients that are received prior to a last gradient received may be stored in storage of the remote system 160 (e.g., in update(s) database 160A) until the federated averaging engine 170 generates the average gradient.

Also, for example, in implementations where the updated corresponding on-device ML model and/or the one or more updated on-device weights thereof correspond to the federated averaging update $120C_1$, the federated averaging engine 170 may generate one or more average weights that is an average of the one or more updated on-device weights and one or more corresponding additional on-device weights received from additional client devices that were also selected for inclusion in the first subset of first subset client devices. Further, the global update engine 174 of the remote system may update the given global ML model based on the one or more average weights by replacing one or more global weights of the given global ML model with the one or more average weights. Notably, in these implementations, the federated averaging engine 170 may wait until these on-device weights are received from each of the first subset client devices. Accordingly, any on-device weights that are received prior to one or more last on-device weights received may be stored in storage of the remote system 160

(e.g., in the update(s) database 160A) until the federated averaging engine 170 generates the one or more average weights.

Also, for example, in implementations where the differences between the one or more on-device weights of the corresponding on-device ML model (e.g., differences between the on-device weights pre-update and post-update of the corresponding on-device ML model) correspond to the federated averaging update 120C1, the federated averaging engine 170 may generate one or more average differences in on-device weights between these differences the one or more on-device weights received from the client device 120₁ and one or more corresponding additional differences in corresponding on-device weights pre-update and post-update of additional corresponding on-device ML models received from additional client devices that were also selected for inclusion in the first subset of first subset client devices. Further, the global update engine 174 of the remote system may update the given global ML model based on the one or more average differences of the on-device weights by applying these differences to one or more global weights of the given global ML model. Notably, in these implementations, the federated averaging engine 170 may wait until these differences between the on-device weights are received from each of the first subset client devices to determine the one or more average differences. Accordingly, any differences between on-device weights that are received prior to one or more differences of the on-device weights received may be stored in storage of the remote system 160 (e.g., in the update(s) database 160A) until the federated averaging engine 170 generates the one or more average weights.

In various implementations, the federated distillation engine 172 may distill the corresponding on-device ML model included in the corresponding federated distillation update $120C_N$ into the given global ML model. For example, in implementations where the one or more labels corresponds to the corresponding federated distillation update $120C_N$ received from the client device $120_N$, the federated distillation engine 172 may process, using the given global ML model, the public data (e.g., that was utilized to generate the one or more labels) to generate one or more predicted outputs. In this example, the one or more labels may be utilized as a supervision signal to generate a remote gradient and/or remote loss(es) that the global update engine 174 may utilize to update the given global ML model. Notably, in these implementations, the federated distillation engine 172 may process the public data as the one or more labels are received and not have to wait for the one or more labels from each of the second subset client devices.

Also, for example, in implementations where the corresponding updated on-device ML model and/or the one or more on-device weights thereof correspond to the corresponding federated distillation update $120C_N$ received from the client device $120_N$ (e.g., without any labels), the federated distillation engine 172 may process, using the corresponding on-device ML model, public data to generate the one or more labels. Put another way, rather than the one or more labels being generated locally at the client device $120_N$, the one or more labels may be generated at the remote system 160. In this example, the federated distillation engine 172 may subsequently process, using the given global ML model, the public data (e.g., that was utilized to generate the one or more labels) to generate one or more predicted outputs. Further, the one or more labels may be utilized as a supervision signal to generate a remote gradient and/or remote loss(es) that the global update engine 174 may utilize to update the given global ML model.

Notably, in these implementations, the global update engine 174 may cause the given global ML model to be updated based on the corresponding federated averaging updates (e.g., the average gradient generated by the federated averaging engine 170, the one or more average on-device weights generated by the federated averaging engine 170, etc.) prior to causing the corresponding on-device ML models to be distilled into the given global ML model based on the corresponding federated distillation updates. This enables the given global ML model to be initialized based on the corresponding federated averaging updates, which may result in more effective distillation of the corresponding on-device ML models into the given global ML model.

However, in other implementations, the global update engine 174 may cause the corresponding on-device ML models to be distilled into the given global ML model based on the corresponding federated distillation updates prior to causing the given global ML model to be updated based on the corresponding federated averaging updates. In these implementations, and prior to causing the corresponding on-device ML models to be distilled into the given global ML model based on the corresponding federated distillation updates, the global update engine 174 may cause an instance of the one or more global weights of the given global ML model to be stored in global ML model(s) database 160B (e.g., store a copy of the one or more global weights of the given global ML model in the global ML model(s) database 160B). Further, the global update engine 174 may cause the corresponding on-device ML models to be distilled into the given global ML model and update the given global ML model based on the distillation, thereby updating the one or more global weights of the given global ML model. Moreover, the global update engine 174 may compare the one or more global weights of the given global ML model updated via the distillation to the instance of the one or more global weights of the given global ML model that were stored in global ML model(s) database 160B to determine a corresponding difference between one or more of these global weights, and the corresponding difference may be utilized as a distillation gradient. Additionally, the global update engine 174 may reset the one or more weights of the given global ML model, and cause the given global ML model to be updated based on a combination of the distillation gradient and the corresponding federated averaging updates. Notably, in these implementations, the above operations may be performed during the given round of federated learning.

In various implementations, an update distribution engine 176 of the remote system 160 may transmit one or more of the updated given global ML models 176A and/or one or more of the updated global weights thereof to the plurality of client device $120_1$-$120_N$. In some implementations, the update distribution engine 176 may transmit one or more of the updated global ML models 176A and/or one or more of the updated global weights thereof to the plurality of client devices $120_1$-$120_N$ in response to one or more conditions being satisfied for the client devices and/or the remote system 160 or in response to a subsequent round of federated learning of the given global ML model being initiated. Upon receiving one or more of the updated global ML models 176A and/or one or more of the updated global weights thereof, the plurality of client devices $120_1$-$120_N$ may replace the corresponding on-device ML model (e.g., stored in the corresponding on-device ML model(s) databases $120B_1$-$120B_N$) with one or more of the updated global ML models 176A, or replace one or more local weights of one or more of the local ML models with one or more of the updated global weights of the updated ML model(s) 176A. Further, the client devices may subsequently use one or more of the updated on-device ML model(s) to make predictions based on further client data for use in a subsequent iteration of updating and/or for use at inference.

Figure 2:
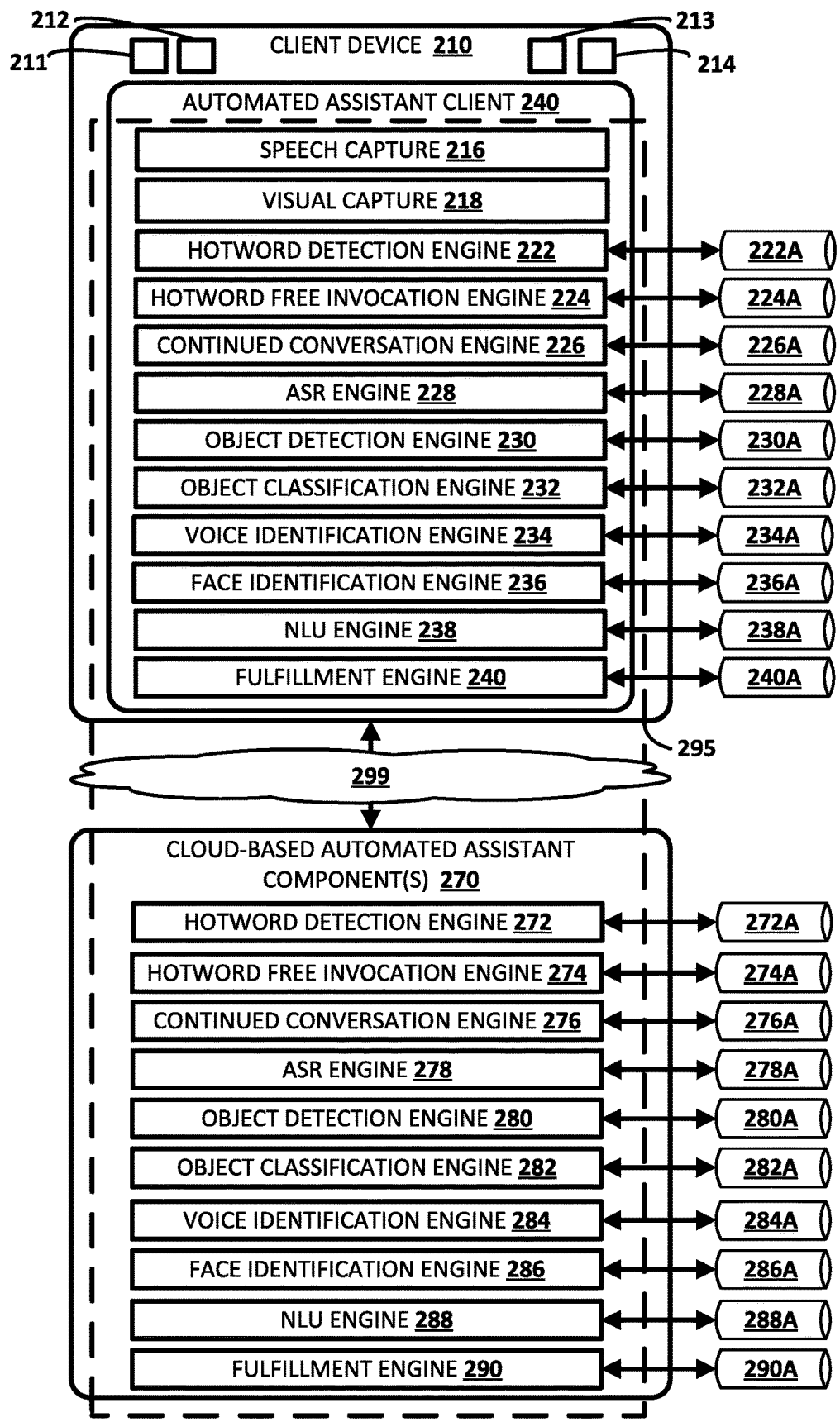
FIG. 2 depicts a block diagram that demonstrates various aspects of the present disclosure, and in which implementations disclosed herein may be implemented.

Turning now to FIG. 2, a block diagram that demonstrates various aspects of the present is depicted. The block diagram of FIG. 2 includes a client device 210 having various on-device machine learning (ML) engines, that utilize various ML models that may be trained in the manner described herein, and that are included as part of (or in communication with) an automated assistant client 240. Other components of the client device 210 are not illustrated in FIG. 2 for simplicity. FIG. 2 illustrates one example of how the various on-device ML engines of and the respective ML models may be utilized by the automated assistant client 240 in performing various actions.

The client device 210 in FIG. 2 is illustrated with one or more microphones 211 for generating audio data, one or more speakers 212 for rendering audio data, one or more vision components 213 for generating vision data, and display(s) 214 (e.g., a touch-sensitive display) for rendering visual data and/or for receiving various touch and/or typed inputs. The client device 210 may further include pressure sensor(s), proximity sensor(s), accelerometer(s), magnetometer(s), and/or other sensor(s) that are used to generate other sensor data. The client device 210 at least selectively executes the automated assistant client 240. The automated assistant client 240 includes, in the example of FIG. 2, hotword detection engine 222, hotword free invocation engine 224, continued conversation engine 226, ASR engine 228, object detection engine 230, object classification engine 232, voice identification engine 234, and face identification engine 236. The automated assistant client 240 further includes speech capture engine 216 and visual capture engine 218. It should be understood that the ML engines and ML models depicted in FIG. 2 are provided for the sake of example to illustrate various ML models that may be trained in the manner described herein, and are not meant to be limiting. For example, the automated assistant client 240 can further include additional and/or alternative engines, such as a text-to-speech (TTS) engine and a respective TTS model, a voice activity detection (VAD) engine and a respective VAD model, an endpoint detector engine and a respective endpoint detector model, a lip movement engine and a respective lip movement model, and/or other engine(s) along with respective ML model(s). Moreover, it should be understood that one or more of the engines and/or models described herein can be combined, such that a single engine and/or model can perform the functions of multiple engines and/or models described herein.

One or more cloud-based automated assistant components 270 can optionally be implemented on one or more computing systems (collectively referred to as a "cloud" computing system) that are communicatively coupled to client device 210 via one or more networks as indicated generally by 299. The cloud-based automated assistant components 270 can be implemented, for example, via a high-performance remote server cluster of high-performance remote servers. In various implementations, an instance of the automated assistant client 240, by way of its interactions with one or more of the cloud-based automated assistant components 270, may form what appears to be, from a user's perspective, a logical instance of an automated assistant as indicated generally by 295 with which the user may engage in a human-to-computer interactions (e.g., spoken interactions, gesture-based interactions, typed-based interactions, and/or touch-based interactions). The one or more cloud-based automated assistant components 270 include, in the example of FIG. 2, cloud-based counterparts of the ML engines of the client device 210 described above, such as hotword detection engine 272, hotword free invocation engine 274, continued conversation engine 276, ASR engine 278, object detection engine 280, object classification engine 282, voice identification engine 284, and face identification engine 286. Again, it should be understood that the ML engines and ML models depicted in FIG. 2 are provided for the sake of example to illustrate various ML models that may be trained in the manner described herein, and are not meant to be limiting.

The client device 210 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided. Notably, the client device 210 may be personal to a given user (e.g., a given user of a mobile device) or shared amongst a plurality of users (e.g., a household of users, an office of users, or the like).

The one or more vision components 213 can take various forms, such as monographic cameras, stereographic cameras, a LIDAR component (or other laser-based component(s)), a radar component, etc. The one or more vision components 213 may be used, e.g., by the visual capture engine 218, to capture vision data corresponding to vision frames (e.g., image frames, video frames, laser-based vision frames, etc.) of an environment in which the client device 210 is deployed. In some implementations, such vision frames can be utilized to determine whether a user is present near the client device 210 and/or a distance of a given user of the client device 210 relative to the client device 210. Such determination of user presence can be utilized, for example, in determining whether to activate one or more of the various on-device ML engines depicted in FIG. 2, and/or other engine(s). Further, the speech capture engine 216 can be configured to capture a user's spoken utterance(s) and/or other audio data captured via the one or more of the microphones 211, and optionally in response to receiving a particular input to invoke the automated assistant 295 (e.g., via actuation of a hardware or software button of the client device 210, via a particular word or phrase, via a particular gesture, etc.).

As described herein, such audio data, vision data, textual data, and/or any other data generated locally at the client device 210 (collectively referred to herein as "client data") can be processed by the various engines depicted in FIG. 2 to generate predicted output at the client device 210 using corresponding ML models and/or at one or more of the cloud-based automated assistant components 270 using corresponding ML models. Notably, the predicted output generated using the corresponding ML models may vary based on the client data (e.g., whether the client data is audio data, vision data, textual data, and/or other data) and/or the corresponding ML models utilized in processing the client data.

As some non-limiting example, the respective hotword detection engines 222, 272 can utilize respective hotword detection models 222A, 272A to predict whether audio data includes one or more particular words or phrases to invoke the automated assistant 295 (e.g., "Ok Assistant", "Hey Assistant", "What is the weather Assistant?", etc.) or certain functions of the automated assistant 295 (e.g., "Stop" to stop an alarm sounding or music playing or the like); the respective hotword free invocation engines 224, 274 can utilize respective hotword free invocation models 224A, 274A to predict whether non-audio data (e.g., vision data) includes a physical motion gesture or other signal to invoke the automated assistant 295 (e.g., based on a gaze of the user and optionally further based on mouth movement of the user); the respective continued conversation engines 226, 276 can utilize respective continued conversation models 226A, 276A to predict whether further audio data is directed to the automated assistant 295 (e.g., or directed to an additional user in the environment of the client device 210); the respective ASR engines 228, 278 can utilize respective ASR models 228A, 278A to generate recognized text in one or more languages, or predict phoneme(s) and/or token(s) that correspond to audio data detected at the client device 210 and generate the recognized text in the one or more languages based on the phoneme(s) and/or token(s); the respective object detection engines 230, 280 can utilize respective object detection models 230A, 280A to predict object location(s) included in vision data captured at the client device 210; the respective object classification engines 232, 282 can utilize respective object classification models 232A, 282A to predict object classification(s) of object(s) included in vision data captured at the client device 210; the respective voice identification engines 234, 284 can utilize respective voice identification models 234A, 284A to predict whether audio data captures a spoken utterance of one or more known users of the client device 210 (e.g., by generating a speaker embedding, or other representation, that can be compared to a corresponding actual embedding for the one or more known users of the client device 210); and the respective face identification engines 236, 286 can utilize respective face identification models 236A, 286A to predict whether vision data captures one or more known users of the client device 210 in an environment of the client device 210 (e.g., by generating a face embedding, or other representation, that can be compared to a corresponding face embedding for the one or more known users of the client device 210).

In some implementations, the client device 210 and one or more of the cloud-based automated assistant components 270 may further include natural language understanding (NLU) engines 238, 288 and fulfillment engines 240, 290, respectively. The NLU engines 238, 288 may perform natural language understanding and/or natural language processing utilizing respective NLU models 238A, 288A, on recognized text, predicted phoneme(s), and/or predicted token(s) generated by the ASR engines 228, 278 to generate NLU data. The NLU data can include, for example, intent(s) for a spoken utterance captured in audio data, and optionally slot value(s) for parameter(s) for the intent(s). Further, the fulfillment engines 240, 290 can generate fulfillment data utilizing respective fulfillment models or rules 240A, 290A, and based on processing the NLU data. The fulfillment data can, for example, define certain fulfillment that is responsive to user input (e.g., spoken utterances, typed input, touch input, gesture input, and/or any other user input) provided by a user of the client device 210. The certain fulfillment can include causing the automated assistant 295 to interact with software application(s) accessible at the client device 210, causing the automated assistant 295 to transmit command(s) to Internet-of-things (IoT) device(s) (directly or via corresponding remote system(s)) based on the user input, and/or other resolution action(s) to be performed based on processing the user input. The fulfillment data is then provided for local and/or remote performance/execution of the determined action(s) to cause the certain fulfillment to be performed.

In other implementations, the NLU engines 238, 288 and the fulfillment engines 240, 290 may be omitted, and the ASR engines 228, 278 can generate the fulfillment data directly based on the user input. For example, assume one or more of the ASR engines 228, 278 processes, using one or more of the respective ASR models 228A, 278A, a spoken utterance of "turn on the lights." In this example, one or more of the ASR engines 228, 278 can generate a semantic output that is then transmitted to a software application associated with the lights and/or directly to the lights that indicates that they should be turned on without actively using one or more of the NLU engines 238, 288 and/or one or more of the fulfillment engines 240, 290 in processing the spoken utterance.

Notably, the one or more cloud-based automated assistant components 270 include cloud-based counterparts to the engines and models described herein with respect to the client device 210 of FIG. 2. However, in some implementations, these engines and models of the one or more cloud-based automated assistant components 270 may not be utilized since these engines and models may be transmitted directly to the client device 210 and executed locally at the client device 210. In other implementations, these engines and models may be utilized exclusively when the client device 210 detects any user input and transmits the user input to the one or more cloud-based automated assistant components 270. In various implementations, these engines and models executed at the client device 210 and the one or more cloud-based automated assistant components 270 may be utilized in conjunction with one another in a distributed manner. In these implementations, a remote execution module can optionally be included to perform remote execution using one or more of these engines and models based on local or remotely generated NLU data and/or fulfillment data. Additional and/or alternative remote engines can be included.

As described herein, in various implementations on-device speech processing, on-device image processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more of the cloud-based automated assistant components 270 can be utilized at least selectively. For example, such component(s) can be utilized in parallel with on-device component(s) and output from such component(s) utilized when local component(s) fail. For example, if any of the on-device engines and/or models fail (e.g., due to relatively limited resources of client device 210), then the more robust resources of the cloud may be utilized.

Figure 3:
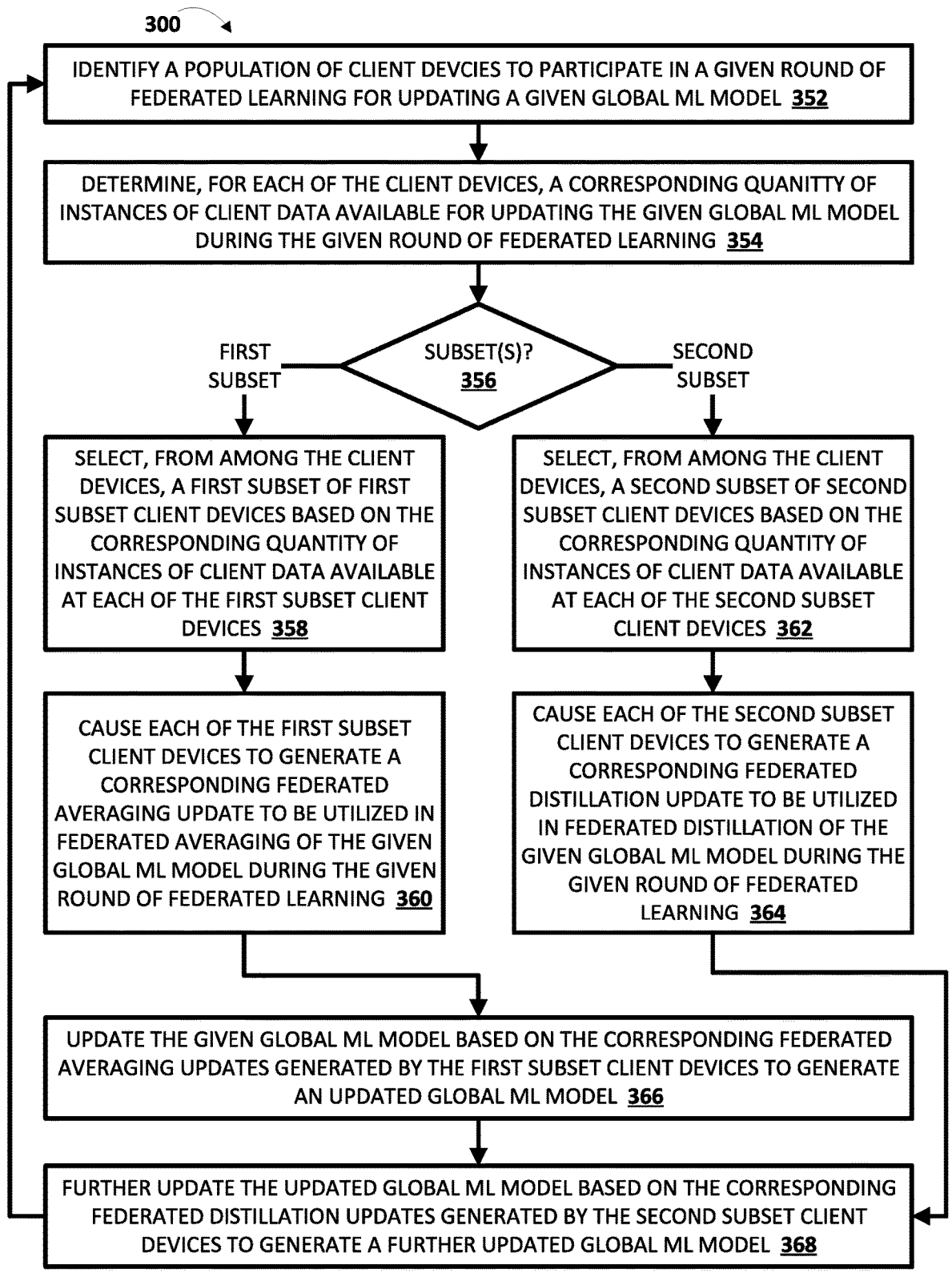
FIG. 3 depicts a flowchart illustrating an example method of a remote system utilizing a hybrid federated learning technique in updating a given global machine learning (ML) model, in accordance with various implementations.

Turning now to FIG. 3, a flowchart illustrating an example method 300 of a remote system utilizing a hybrid federated learning technique in updating a given global machine learning (ML) model is depicted. For convenience, the operations of the method 300 are described with reference to a system that performs the operations. The system of method 300 includes one or more processors and/or other component(s) of a computing device (e.g., the remote system 160 of FIG. 1, the cloud-based automated assistant component(s) 270 of FIG. 2, computing device 510 of FIG. 5, one or more high performance servers, and/or other computing devices). Moreover, while operations of the method 300 are shown in a particular order, this is not meant to be limiting. One or more operations may be reordered, omitted, or added.

At block 352, the system identifies a population of client devices to participate in a given round of federated learning for updating a given global ML model (e.g., as described with respect to the client device identification engine 162 of FIG. 1). At block 354, the system determines, for each of the client devices, a corresponding quantity of instances of client data available for updating the given global ML model during the given round of federated learning (e.g., as described with respect to the client device query engine 164 of FIG. 1). At block 356, the system may determine whether to select one or more of the client devices, from among the population, for inclusion in a first subset of first subset client devices or for inclusion in a second subset of second subset client devices (e.g., as described with respect to the client device distribution engine 166 of FIG. 1).

If, at an iteration of block 356, the system determines to select one or more of the client devices for inclusion in a first subset of first subset client devices, then the system may proceed to block 358. At block 358, the system selects, from among the client devices, a first subset of first subset client devices based on the corresponding quantity of instances of client data available at each of the first subset client devices (e.g., as described with respect to the client device selection engine 168 of FIG. 1). At block 360, the system causes each of the first subset client devices to generate a corresponding federated averaging update to be utilized in federated averaging of the given global ML model during the given round of federated learning (e.g., as described with respect to the client device $120_1$ of FIG. 1 and as described with respect to FIG. 4A). The system may proceed to block 366. The operations of block 366 are described in more detail below.

If, at an iteration of block 356, the system determines to select one or more of the client devices for inclusion in a second subset of second subset client devices, then the system may proceed to block 362. At block 362, the system selects, from among the client devices, a second subset of second subset client devices based on the corresponding quantity of instances of client data available at each of the second subset client devices (e.g., as described with respect to the client device selection engine 168 of FIG. 1). At block 364, the system causes each of the second subset client devices to generate a corresponding federated distillation update to be utilized in federated distillation of the given global ML model during the given round of federated learning (e.g., as described with respect to the client device $120_N$ of FIG. 1 and as described with respect to FIG. 4B). The system may proceed to block 368. The operations of block 368 are described in more detail below.

At block 366, the system updates the given global ML model based on the corresponding federated averaging updates generated by the first subset client devices to generate an updated global ML model (e.g., as described with respect to the federated averaging engine 170 and the global update engine 174 of FIG. 1). At block 368, the system further updates the updated global ML model based on the corresponding federated distillation updates generated by the second subset client devices to generate a further updated global ML model (e.g., as described with respect to the federated distillation engine 172 and the global update engine 174 of FIG. 1). The system may return to block 352 to perform an additional iteration of the method 300 with respect to the population of client devices and/or an additional population of client devices that includes at least one unique client device that was included in the population of client devices.

Although the method 300 of FIG. 3 is only described with respect to a single iteration, it should be understood that is for the sake of example and is not meant to be limiting. For example, the system may cause multiple iterations of the method 300 of FIG. 3 to be performed in a parallel manner with respect to other instances of the given global ML model via other populations of client devices, other given global ML models via the population of client devices and/or other populations of client devices, and/or in other manners.

Further, although the method 300 of FIG. 3 is described with respect to the given global ML model being initially updated based on the corresponding federated averaging updates and subsequently further updates based on the corresponding federated distillation updates, it should be understood that is for the sake of example to describe one implementation contemplated herein, and is not meant to be limiting. For instance, in other implementations, the global ML model may be simultaneously updated based on the corresponding federated averaging updates and the corresponding federated distillation updates, or initially updated based on the corresponding federated distillation updates and subsequently further updated based on the corresponding federated averaging updates. As one non-limiting example, the system may cause an instance of the one or more global weights of the global ML model to be stored in remote memory of the remote system (e.g., the global ML model(s) database 160B of FIG. 1). Further, the system may cause the corresponding on-device ML models to be distilled into the global ML model and update the given global ML model based on the distillation, thereby updating the one or more global weights of the given global ML model. Moreover, the system may compare the one or more global weights of the global ML model updated via the distillation to the stored instance of the one or more global weights of the global ML model pre-update to determine a corresponding difference between one or more of these global weights, and the corresponding difference may be utilized as a distillation gradient. Additionally, the system may reset the one or more weights of the given global ML model, and cause the given global ML model to be updated based on a combination of the distillation gradient and the corresponding federated averaging updates in a parallel manner.

Figure 4A:
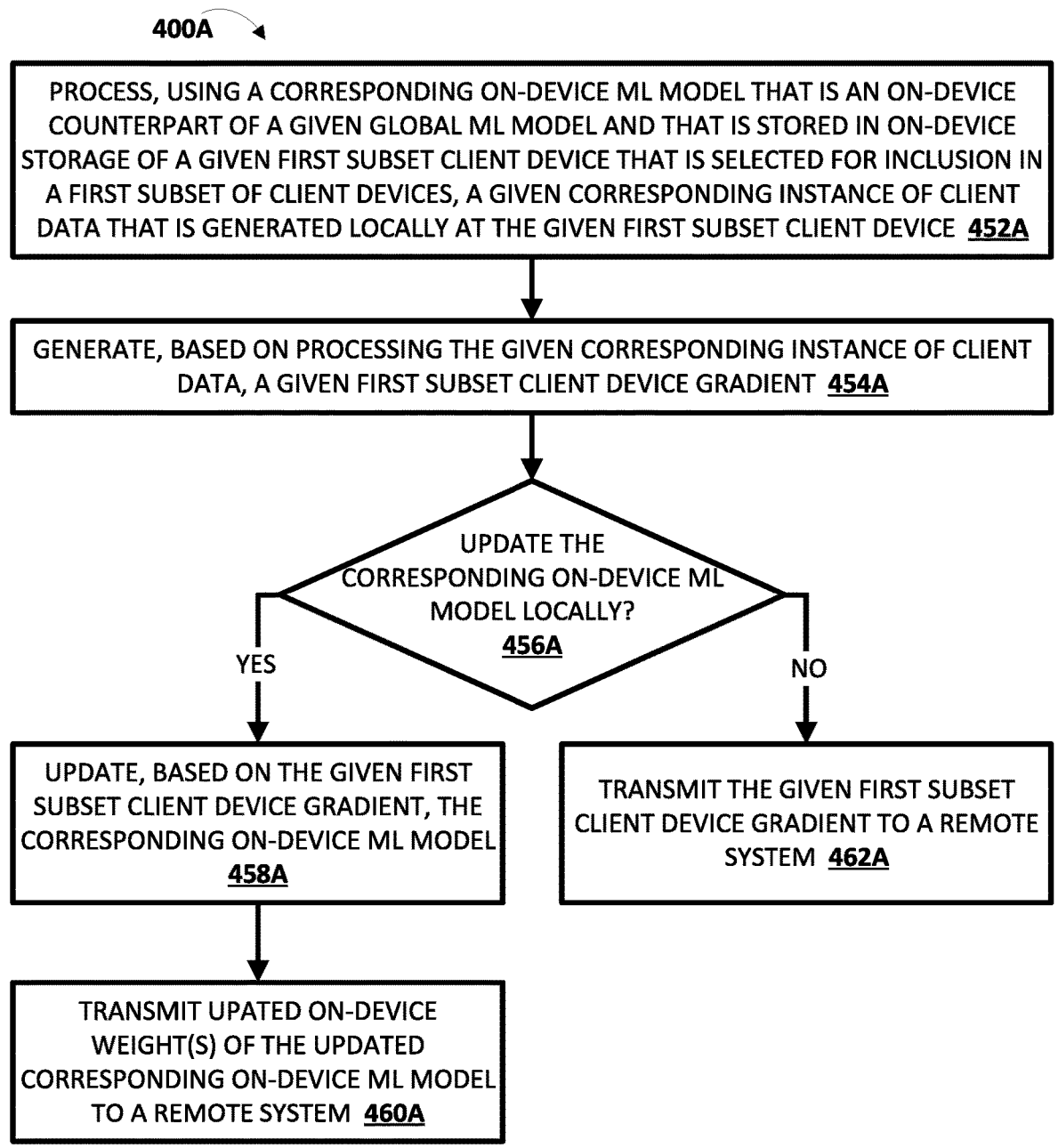
FIG. 4A and FIG. 4B depict flowcharts illustrating example methods of client devices generating different federated learning updates for utilization in the hybrid federated learning technique of FIG. 3, in accordance with various implementations.
Figure 4B:
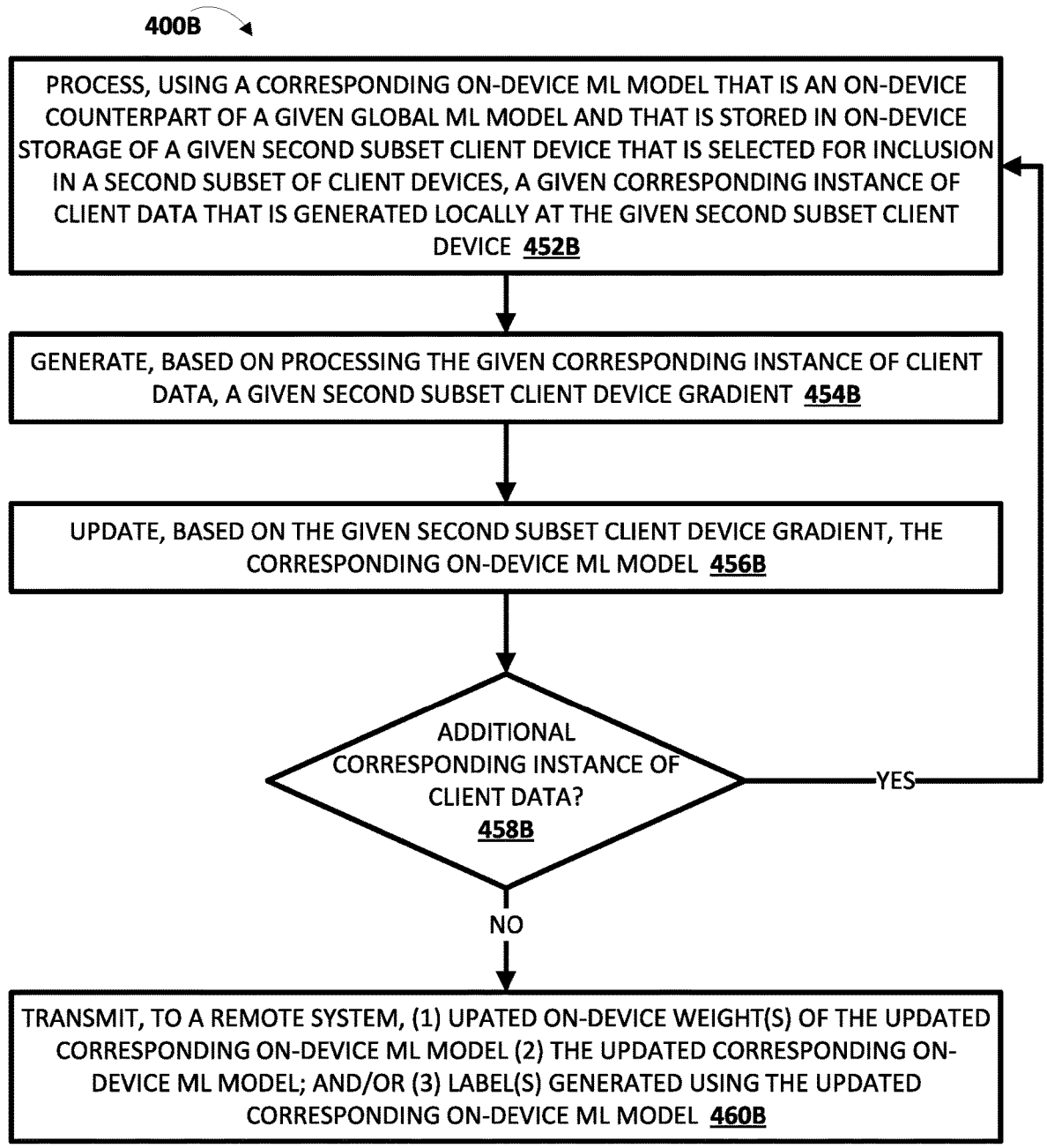

Turning now to FIGS. 4A and 4B, flowchart illustrating example methods 400A and 400B, respectively, of client devices generating different federated learning updates for utilization in the hybrid federated learning technique of FIG. 3 are depicted. For example, the flowchart of the method 400A of FIG. 4A is described with respect to a given first subset client device that is selected for inclusion in the first subset in the method 300 of FIG. 3, and the flowchart of the method 400B of FIG. 4B is described with respect to a given second subset client device that is selected for inclusion in the first subset in the method 300 of FIG. 3. For convenience, the operations of the methods 400A and 4008 are described with reference to a system that performs the operations. The system of methods 400A and 4008 includes one or more processors and/or other component(s) of a computing device (e.g., the client device $110_1$ of FIG. 1, the client device $110_N$ of FIG. 1, the client device 210 of FIG. 2, computing device 510 of FIG. 5, and/or other computing devices). Moreover, while operations of the methods 400A and 4008 are shown in a particular order, this is not meant to be limiting. One or more operations may be reordered, omitted, or added.

Referring specifically to FIG. 4A, at block 452A, the system processes, using a corresponding on-device ML model that is an on-device counterpart of a given global ML model (e.g., the given global ML model updated according to the method 300 of FIG. 3) and that is stored in on-device storage of a given first subset client device that is selected for inclusion in a first subset of client devices (e.g., at block 358 of the method 300 of FIG. 3), a given corresponding instance of client data that is generated locally at the given first subset client device (e.g., as described with respect to the on-device ML model engine $122_1$ of FIG. 1). At block 454A, the system generates, based on processing the given corresponding instance of client data, a given first subset client device gradient (e.g., as described with respect to the gradient engine $124_1$ and/or the learning engine $126_1$ of FIG. 1).

At block 456A, the system determines whether to update the corresponding on-device ML model locally at the given first subset client device and based on the given first subset client device gradient. In some implementations, the system may always update the corresponding on-device ML model. In other implementations, the system may refrain from updating the corresponding on-device ML model to conserve computational resources at the given first subset client device.

If, at an iteration of block 456A, the system determines to update the corresponding on-device ML model locally at the given first subset client device and based on the given first subset client device gradient, then the system may proceed to block 458A. At block 458A, the system updates, based on the given first subset client device gradient, the corresponding on-device ML model (e.g., as described with respect to the on-device update engine $128_1$). At block 460A, the system transmits one or more updated on-device weights of the updated corresponding on-device ML model to a remote system (e.g., over one or more networks). In these implementations, the corresponding federated averaging update may correspond to the updated corresponding on-device ML model and/or one or more updated on-device weights thereof (e.g., as described with respect to the federated averaging update $120C_1$ of FIG. 1).

If, at an iteration of block 456A, the system determines not to update the corresponding on-device ML model locally at the given first subset client device and based on the given first subset client device gradient, then the system may proceed to block 462A. At block 4662A, the system transmits the given first subset client device gradient to a remote system (e.g., as described with respect to the federated averaging update $120C_1$ of FIG. 1).

Referring specifically to FIG. 4B, at block 452B, the system processes, using a corresponding on-device ML model that is an on-device counterpart of a given global ML model (e.g., the given global ML model updated according to the method 300 of FIG. 3) and that is stored in on-device storage of a given second subset client device that is selected for inclusion in a second subset of client devices (e.g., at block 362 of the method 300 of FIG. 3), a given corresponding instance of client data that is generated locally at the given second subset client device (e.g., as described with respect to the on-device ML model engine $122_N$ of FIG. 1). At block 454B, the system generates, based on processing the given corresponding instance of client data, a given second subset client device gradient (e.g., as described with respect to the gradient engine $124_N$ and/or the learning engine $126_N$ of FIG. 1). At block 456B, the system updates, based on the given second subset client device gradient, the corresponding on-device ML model (e.g., as described with respect to the on-device update engine $128_N$ of FIG. 1).

At block 458B, the system determines whether there is an additional corresponding instance of client data to be processed using the corresponding on-device ML model. If, at an iteration of block 458B, the system determines that there is an additional corresponding instance of client data to be processed using the corresponding on-device ML model, then the system may return to block 452B to process the additional corresponding instance of client data and using the corresponding on-device ML model according to the method 300 of FIG. 3 to further update the corresponding on-device ML model. If, at an iteration of block 458B, the system determines that there is not an additional corresponding instance of client data to be processed using the corresponding on-device ML model, then the system may proceed to block 460B. In some implementations, the system may update the corresponding on-device ML model subsequent to each second subset client device gradient generated as depicted in FIG. 4B, whereas in other implementations, the system may wait for each second subset client device gradient to be generated prior to updating the corresponding on-device ML model (e.g., the operations of block 458B may be performed prior to the operations of block 456B).

At block 460B, the system transmits, to a remote system, (1) one or more updated on-device weights of the updated corresponding on-device ML model, (2) the updated corresponding on-device ML model, and/or (3) one or more labels generated using the updated corresponding on-device ML model (e.g., as described with respect to the federated distillation update $120C_N$ of FIG. 1).

Figure 5:
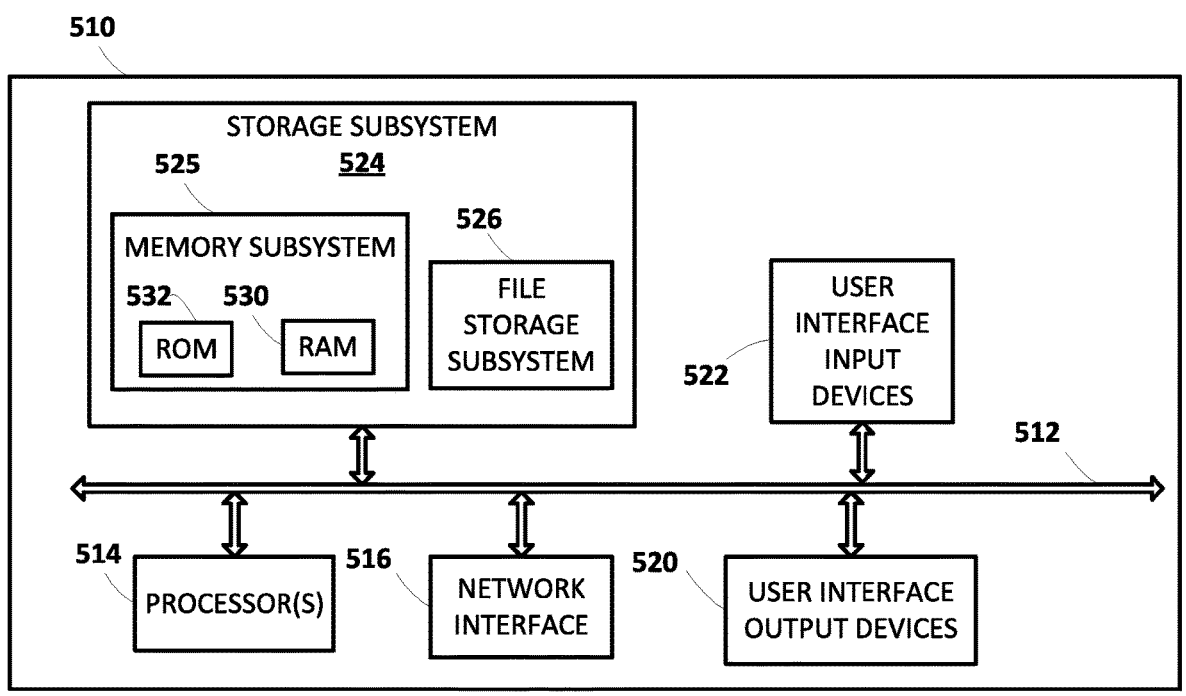
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIGS. 1 and 2.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors of a remote system is provided and includes identifying a population of client devices to participate in a given round of federated learning for updating a given global machine learning (ML) model; determining, for each of the client devices of the population, a corresponding quantity of instances of client data available for updating the given global ML model during the given round of federated learning; selecting, from among the client devices of the population, a first subset of first subset client devices based on the corresponding quantity of instances of client data available at each of the first subset client devices; selecting, from among the client devices of the population, a second subset of second subset client devices based on the corresponding quantity of instances of client data available at each of the second subset client devices; causing each of the first subset client devices, of the first subset, to generate a corresponding federated averaging update to be utilized in federated averaging of the given global ML model during the given round of federated learning; causing each of the second subset client devices, of the second subset, to generate a corresponding federated distillation update to be utilized in federated distillation of the given global ML model during the given round of federated learning; updating the given global ML model based on the corresponding federated averaging updates generated by the first subset client devices of the first subset to generate an updated global ML model; and subsequent to updating the given global ML model based on the corresponding federated averaging updates generated by the first subset client devices of the first subset, further updating the updated global ML model based on the corresponding federated distillation updates generated by the second subset client devices of the second subset to generate a further updated global ML model.

These and other implementations of the technology can include one or more of the following features.

In some implementations, causing a given first subset client device, of the first subset, to generate the corresponding federated averaging update may include causing the given first subset client device to: process, using a corresponding on-device ML model that is an on-device counterpart of the given global ML model and that is stored in on-device storage of the given first subset client device, a given corresponding instance of client data that is generated locally at the given first subset client device; generate, based on processing the given corresponding instance of client data, a given first subset client device gradient; and transmit the given first subset client device gradient to the remote system as the corresponding federated averaging update to be utilized in federated averaging of the given global ML model during the given round of federated learning. In some versions of those implementations, updating the given global ML model based on the corresponding federated averaging updates generated by the first subset client devices of the first subset to generate the updated global ML model may include averaging the given first subset client device gradient, that is received from the given first subset client device, and corresponding additional first subset client device gradients, that are received from each of the other first subset client devices that are in addition to the given first subset client device, to generate an average gradient for the first subset client devices; and updating the given global ML model based on the average gradient for the first subset client devices to generate the updated global ML model.

In some implementations, causing a given first subset client device, of the first subset, to generate the corresponding federated averaging update may include causing the given first subset client device to: process, using a corresponding on-device ML model that is an on-device counterpart of the given global ML model and that is stored in on-device storage of the given first subset client device, a given corresponding instance of client data that is generated locally at the given first subset client device; generate, based on processing the given corresponding instance of client data, a given first subset client device gradient; update, based on the given first subset client device gradient, one or more corresponding on-device weights of the corresponding on-device ML model to generate an updated corresponding on-device ML model; and transmit the one or more corresponding on-device weights to the remote system as the corresponding federated averaging update to be utilized in federated averaging of the given global ML model during the given round of federated learning. In some versions of those implementations, updating the given global ML model based on the corresponding federated averaging updates generated by the first subset client devices of the first subset to generate the updated global ML model may include averaging the one or more corresponding on-device weights, that are received from the given first subset client device, and one or more corresponding additional on-device weights, that are received from each of the other first subset client devices that are in addition to the given first subset client device, to generate one or more average corresponding on-device weights for the first subset client devices; and updating the given global ML model based on the one or more average corresponding on-device weights for the first subset client devices to generate the updated global ML model.

In some implementations, causing a given second subset client device, of the second subset, to generate the corresponding federated distillation update may include causing the given second subset client device to, and for each corresponding instance of client data available at the given second subset client device: process, using a corresponding on-device ML model that is an on-device counterpart of the given global ML model and that is stored in on-device storage of the given first subset client device, a given corresponding instance of client data that is generated locally at the given first subset client device; generate, based on processing the given corresponding instance of client data, a given second subset client device gradient; and update, based on the given second subset client device gradient, one or more corresponding on-device weights of the corresponding on-device ML model to generate an updated corresponding on-device ML model. Further, causing a given second subset client device, of the second subset, to generate the corresponding federated distillation update may further include causing the given second subset client device to, and subsequent to processing each corresponding instance of client data available at the given second subset client device: transmit the updated corresponding on-device ML model to the remote system as the corresponding federated distillation update to be utilized in federated distillation of the given global ML model during the given round of federated learning. In some versions of those implementations, further updating the updated global ML model based on the corresponding federated distillation updates generated by the second subset client devices of the second subset to generate the further updated global ML model may include distilling the updated corresponding on-device ML model, that is received from the given second subset client device, and additional corresponding on-device ML models, that are received from each of the other second subset client devices, into the remote system to generate the further updated global ML model.

In some implementations, the method may further include generating, based on the corresponding quantity of instances of client data that are available at each of the client devices of the population, a distribution of the client devices of the population; selecting, from among the client devices of the population, the first subset client devices for inclusion in the first subset based on each of the first subset client devices belonging to a first portion of the distribution of the client devices of the population; and selecting, from among the client devices of the population, the second subset client devices for inclusion in the second subset based on each of the second subset client devices belonging to a second portion of the distribution of the client devices of the population that is distinct from the first portion of the distribution of the client devices of the population. In some versions of those implementations, each of the second subset client devices may have a greater quantity of instances of client data that are available for updating the given global ML model during the given round of federated learning than each of the first subset client devices. In additional or alternative versions of those implementations, each of the first subset client devices may be associated with a first learning rate, each of the second subset client devices may be associated with a second learning rate, and the second learning rate may be faster than the first learning rate.

In some implementations, determining the corresponding quantity of instances of client data available for updating the given global ML model during the given round of federated learning and for each of the client devices of the population may include transmitting a query to each of the client devices of the population that requests an indication of the corresponding quantity of instances of client data available for updating the given global ML model during the given round of federated learning; and receiving, from each of the client devices of the population, the indication of the corresponding quantity of instances of client data available for updating the given global ML model during the given round of federated learning. In some versions of those implementations, the query that is transmitted to each of the client devices of the population may be based on a type of the given global ML model to be updated during the round of federated learning.

In some further versions of those implementations, the type of the given global ML model may be an audio-based global ML model, and the corresponding quantity of instances of client data may correspond to corresponding instances of audio data generated locally at each of the client devices of the population. In additional or alternative further versions of those implementations, the type of the given global ML model may be a text-based global ML model, and the corresponding quantity of instances of client data may correspond to corresponding instances of textual data generated locally at each of the client devices of the population. In additional or alternative further versions of those implementations, the type of the given global ML model may be a vision-based global ML model, and the corresponding quantity of instances of client data may correspond to corresponding instances of vision data generated locally at each of the client devices of the population.

In some implementations, the method may further include, subsequent to further updating the updated global ML model based on the corresponding federated distillation updates generated by the second subset client devices of the second subset to generate the further updated global ML model: transmitting the further updated global ML model to the first subset client devices of the first subset. In some versions of those implementations, and subsequent to further updating the updated global ML model based on the corresponding federated distillation updates generated by the second subset client devices of the second subset to generate the further updated global ML model, the method may further include transmitting the further updated global ML model to the second subset client devices of the second subset. In some versions of those implementations, the given round of federated learning may conclude when the further updated global ML model is transmitted to the one or more of the client devices of the population.

In some implementations, the given round of federated learning may conclude when the further updated global ML model is generated.

In some implementations, a method implemented by one or more processors of a remote system is provided, and includes identifying a population of client devices to participate in a given round of federated learning for updating a given global machine learning (ML) model; determining, for each of the client devices of the population, a corresponding quantity of instances of client data available for updating the given global ML model during the given round of federated learning; selecting, from among the client devices of the population, a first subset of first subset client devices based on the corresponding quantity of instances of client data available at each of the first subset client devices; selecting, from among the client devices of the population, a second subset of second subset client devices based on the corresponding quantity of instances of client data available at each of the second subset client devices; causing each of the first subset client devices, of the first subset, to generate a corresponding federated averaging update to be utilized in federated averaging of the given global ML model during the given round of federated learning; causing each of the second subset client devices, of the second subset, to generate a corresponding federated distillation update to be utilized in federated distillation of the given global ML model during the given round of federated learning; updating the given global ML model based on the corresponding federated distillation updates generated by the second subset client devices of the second subset to generate a federated distillation gradient; and subsequent to generating the federated distillation gradient, updating the given global ML model based on the corresponding federated averaging updates generated by the first subset client devices of the first subset and based on the federated distillation gradient to generate an updated global ML model.

These and other implementations of the technology can include one or more of the following features.

In some implementations, the method may further include, prior to updating the given global ML model based on the corresponding federated distillation updates generated by the second subset client devices of the second subset to generate the federated distillation gradient: storing, in remote memory of the remote system, an instance of one or more global weights of the given global ML model. In some versions of those implementations, updating the given global ML model based on the corresponding federated distillation updates generated by the second subset client devices of the second subset to generate the federated distillation gradient may include comparing the stored instance of the one or more global weights of the given global ML model to one or more updated weights of the given global ML model that are determined based on updating the given global ML model based on the corresponding federated distillation updates generated by the second subset client devices of the second subset. In some versions of those implementations, the method may further include, subsequent to generating the federated distillation gradient, and prior to updating the given global ML model based on the corresponding federated averaging updates generated by the first subset client devices of the first subset and based on the federated distillation gradient to generate the updated global ML model: resetting the one or more global weights of the given global ML model. In some further versions of those implementations, updating the given global ML model based on the corresponding federated averaging updates generated by the first subset client devices of the first subset and based on the federated distillation gradient to generate the updated global ML model may include combining the corresponding federated averaging updates and the distillation gradient to generate a combined update; and generating the updated global ML model based on the combined update.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein. Yet other implementations can include a system of one or more client devices that each include one or more processors operable to execute stored instructions to perform a method such as one or more of the methods described herein or select aspects of one or more of the methods described herein.

What is claimed is:

1. A method implemented by one or more processors of a remote system, the method comprising:
   identifying a population of client devices to participate in a given round of federated learning for updating a given global machine learning (ML) model;
   determining, for each of the client devices of the population, a corresponding quantity of instances of client data available for updating the given global ML model during the given round of federated learning;
   selecting, from among the client devices of the population, a first subset of first subset client devices based on the corresponding quantity of instances of client data available at each of the first subset client devices;
   selecting, from among the client devices of the population, a second subset of second subset client devices based on the corresponding quantity of instances of client data available at each of the second subset client devices;
   causing each of the first subset client devices, of the first subset, to generate a corresponding federated averaging update to be utilized in federated averaging of the given global ML model during the given round of federated learning;
   causing each of the second subset client devices, of the second subset, to generate a corresponding federated distillation update to be utilized in federated distillation of the given global ML model during the given round of federated learning;
   updating the given global ML model based on the corresponding federated averaging updates generated by the first subset client devices of the first subset to generate an updated global ML model; and subsequent to updating the given global ML model based on the corresponding federated averaging updates generated by the first subset client devices of the first subset, further updating the updated global ML model based on the corresponding federated distillation updates generated by the second subset client devices of the second subset to generate a further updated global ML model.

2. The method of claim 1, wherein causing a given first subset client device, of the first subset, to generate the corresponding federated averaging update comprises causing the given first subset client device to:
   process, using a corresponding on-device ML model that is an on-device counterpart of the given global ML model and that is stored in on-device storage of the given first subset client device, a given corresponding instance of client data that is generated locally at the given first subset client device;
   generate, based on processing the given corresponding instance of client data, a given first subset client device gradient; and
   transmit the given first subset client device gradient to the remote system as the corresponding federated averaging update to be utilized in federated averaging of the given global ML model during the given round of federated learning.

3. The method of claim 2, wherein updating the given global ML model based on the corresponding federated averaging updates generated by the first subset client devices of the first subset to generate the updated global ML model comprises:
   averaging the given first subset client device gradient, that is received from the given first subset client device, and corresponding additional first subset client device gradients, that are received from each of the other first subset client devices that are in addition to the given first subset client device, to generate an average gradient for the first subset client devices; and
   updating the given global ML model based on the average gradient for the first subset client devices to generate the updated global ML model.

4. The method of claim 1, wherein causing a given first subset client device, of the first subset, to generate the corresponding federated averaging update comprises causing the given first subset client device to:
   process, using a corresponding on-device ML model that is an on-device counterpart of the given global ML model and that is stored in on-device storage of the given first subset client device, a given corresponding instance of client data that is generated locally at the given first subset client device;
   generate, based on processing the given corresponding instance of client data, a given first subset client device gradient;
   update, based on the given first subset client device gradient, one or more corresponding on-device weights of the corresponding on-device ML model to generate an updated corresponding on-device ML model; and
   transmit the one or more corresponding on-device weights to the remote system as the corresponding federated averaging update to be utilized in federated averaging of the given global ML model during the given round of federated learning.

5. The method of claim 4, wherein updating the given global ML model based on the corresponding federated averaging updates generated by the first subset client devices of the first subset to generate the updated global ML model comprises:
   averaging the one or more corresponding on-device weights, that are received from the given first subset client device, and one or more corresponding additional on-device weights, that are received from each of the other first subset client devices that are in addition to the given first subset client device, to generate one or more average corresponding on-device weights for the first subset client devices; and
   updating the given global ML model based on the one or more average corresponding on-device weights for the first subset client devices to generate the updated global ML model.

6. The method of claim 1, wherein causing a given second subset client device, of the second subset, to generate the corresponding federated distillation update comprises causing the given second subset client device to:
   for each corresponding instance of client data available at the given second subset client device:
      process, using a corresponding on-device ML model that is an on-device counterpart of the given global ML model and that is stored in on-device storage of the given second subset client device, a given corresponding instance of client data that is generated locally at the given second subset client device;
      generate, based on processing the given corresponding instance of client data, a given second subset client device gradient; and
      update, based on the given second subset client device gradient, one or more corresponding on-device weights of the corresponding on-device ML model to generate an updated corresponding on-device ML model;
   subsequent to processing each corresponding instance of client data available at the given second subset client device:
      transmit the updated corresponding on-device ML model to the remote system as the corresponding federated distillation update to be utilized in federated distillation of the given global ML model during the given round of federated learning.

7. The method of claim 6, wherein further updating the updated global ML model based on the corresponding federated distillation updates generated by the second subset client devices of the second subset to generate the further updated global ML model comprises:
   distilling the updated corresponding on-device ML model, that is received from the given second subset client device, and additional corresponding on-device ML models, that are received from each of the other second subset client devices, into the remote system to generate the further updated global ML model.

8. The method of claim 1, further comprising:
   generating, based on the corresponding quantity of instances of client data that are available at each of the client devices of the population, a distribution of the client devices of the population;
   selecting, from among the client devices of the population, the first subset client devices for inclusion in the first subset based on each of the first subset client devices belonging to a first portion of the distribution of the client devices of the population; and
   selecting, from among the client devices of the population, the second subset client devices for inclusion in the second subset based on each of the second subset client devices belonging to a second portion of the distribution of the client devices of the population that is distinct from the first portion of the distribution of the client devices of the population.

9. The method of claim 8, wherein each of the second subset client devices have a greater quantity of instances of client data that are available for updating the given global ML model during the given round of federated learning than each of the first subset client devices.

10. The method of claim 8, wherein each of the first subset client devices are associated with a first learning rate, wherein each of the second subset client devices are associated with a second learning rate, and wherein the second learning rate is faster than the first learning rate.

11. The method of claim 1, wherein determining the corresponding quantity of instances of client data available for updating the given global ML model during the given round of federated learning and for each of the client devices of the population comprises:
transmitting a query to each of the client devices of the population that requests an indication of the corresponding quantity of instances of client data available for updating the given global ML model during the given round of federated learning; and
receiving, from each of the client devices of the population, the indication of the corresponding quantity of instances of client data available for updating the given global ML model during the given round of federated learning.

12. The method of claim 11, wherein the query that is transmitted to each of the client devices of the population is based on a type of the given global ML model to be updated during the round of federated learning.

13. The method of claim 12, wherein the type of the given global ML model is an audio-based global ML model, and wherein the corresponding quantity of instances of client data corresponds to corresponding instances of audio data generated locally at each of the client devices of the population.

14. The method of claim 12, wherein the type of the given global ML model is a text-based global ML model, and wherein the corresponding quantity of instances of client data corresponds to corresponding instances of textual data generated locally at each of the client devices of the population.

15. The method of claim 12, wherein the type of the given global ML model is a vision-based global ML model, and wherein the corresponding quantity of instances of client data corresponds to corresponding instances of vision data generated locally at each of the client devices of the population.

16. The method of claim 1, further comprising:
subsequent to further updating the updated global ML model based on the corresponding federated distillation updates generated by the second subset client devices of the second subset to generate the further updated global ML model:
transmitting the further updated global ML model to the first subset client devices of the first subset.

17. The method of claim 16, subsequent to further updating the updated global ML model based on the corresponding federated distillation updates generated by the second subset client devices of the second subset to generate the further updated global ML model, further comprising:
transmitting the further updated global ML model to the second subset client devices of the second subset.

18. The method of claim 16, wherein the given round of federated learning concludes when the further updated global ML model is transmitted to the one or more of the client devices of the population.

19. A system of client devices comprising:
a first client having one or more first client device processors and first client device storage storing instructions that, when executed by the one or more first client device processors, cause the one or more first client device processors to:
process, using a corresponding first client device machine learning (ML) model that is stored in the first client device storage, first client device data that is generated locally at the first client device;
generate, based on processing the first client device data, a first client device gradient; and
transmit the first client device gradient to a remote system to cause the remote system to:
update a global ML model, that is a global counterpart of the corresponding first client device ML model, based on an average of the first client device and a plurality of additional corresponding gradients generated by a plurality of additional client devices, to generate an updated global ML model; and
a second client having one or more second client device processors and second client device storage storing instructions that, when executed by the one or more second client device processors, cause the one or more second client device processors to:
process, using a corresponding second client device ML model that is stored in the second client device storage, second client device data that is generated locally at the second client device;
generate, based on processing the second client device data, a second client device gradient;
update, based on the second client device gradient, the corresponding second client device ML model to generate a corresponding updated second client device ML model; and
transmit the corresponding updated second client device ML model to the remote system to cause the remote system to:
update the updated global ML model, based on distilling the corresponding updated second client device ML model and a plurality of additional corresponding updated client device ML models that are updated by a plurality of further additional client devices, to generate a further updated global ML model.

20. A remote system comprising:
at least one processor; and
memory storing instructions that, when executed by the at least one processor, cause the at least one processor to:
identify a population of client devices to participate in a given round of federated learning for updating a given global machine learning (ML) model;
determine, for each of the client devices of the population, a corresponding quantity of instances of client data available for updating the given global ML model during the given round of federated learning;
select, from among the client devices of the population, a first subset of first subset client devices based on the corresponding quantity of instances of client data available at each of the first subset client devices;
select, from among the client devices of the population, a second subset of second subset client devices based on the corresponding quantity of instances of client data available at each of the second subset client devices;

cause each of the first subset client devices, of the first subset, to generate a corresponding federated averaging update to be utilized in federated averaging of the given global ML model during the given round of federated learning;

cause each of the second subset client devices, of the second subset, to generate a corresponding federated distillation update to be utilized in federated distillation of the given global ML model during the given round of federated learning;

update the given global ML model based on the corresponding federated averaging updates generated by the first subset client devices of the first subset to generate an updated global ML model; and subsequent to updating the given global ML model based on the corresponding federated averaging updates generated by the first subset client devices of the first subset, further update the updated global ML model based on the corresponding federated distillation updates generated by the second subset client devices of the second subset to generate a further updated global ML model.

* * * * *